US007865519B2

(12) United States Patent
Stuhec

(10) Patent No.: US 7,865,519 B2
(45) Date of Patent: Jan. 4, 2011

(54) USING A CONTROLLED VOCABULARY LIBRARY TO GENERATE BUSINESS DATA COMPONENT NAMES

(75) Inventor: Gunther Stuhec, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 616 days.

(21) Appl. No.: 10/990,898

(22) Filed: Nov. 17, 2004

(65) Prior Publication Data

US 2006/0106824 A1 May 18, 2006

(51) Int. Cl.
*G06F 17/30* (2006.01)

(52) U.S. Cl. ....................... 707/771; 707/802; 707/803; 707/E17.006; 707/E17.008; 707/E17.009

(58) Field of Classification Search ....................... None
See application file for complete search history.

(56) References Cited

U.S. PATENT DOCUMENTS

| | | | |
|---|---|---|---|
| 4,714,995 | A | 12/1987 | Materna et al. |
| 4,864,502 | A | 9/1989 | Kucera et al. |
| 5,089,814 | A | 2/1992 | Deluca |
| 5,130,924 | A | 7/1992 | Barker et al. |
| 5,339,392 | A | 8/1994 | Risberg et al. |
| 5,414,841 | A | 5/1995 | Bingham et al. |
| 5,418,957 | A | 5/1995 | Narayan |
| 5,444,841 | A | 8/1995 | Glaser et al. |
| 5,590,049 | A | 12/1996 | Arora |
| 5,694,598 | A | 12/1997 | Durand et al. |
| 5,717,923 | A | 2/1998 | Dedrick |
| 5,797,137 | A | 8/1998 | Golshani et al. |
| 5,899,988 | A | 5/1999 | Depledge et al. |
| 6,018,742 | A | 1/2000 | St. John Herbert, III |
| 6,026,388 | A | 2/2000 | Liddy et al. |
| 6,124,391 | A | 9/2000 | Sun et al. |
| 6,125,391 | A | 9/2000 | Meltzer et al. |
| 6,145,124 | A | 11/2000 | Price |
| 6,163,781 | A | 12/2000 | Wess, Jr. |
| 6,226,674 | B1 | 5/2001 | Klish |

(Continued)

FOREIGN PATENT DOCUMENTS

| | | |
|---|---|---|
| EP | 1239375 | 9/2002 |

(Continued)

OTHER PUBLICATIONS

ISO/IEC 13250, Topic Maps, Information Technology, Document Description and Processing Languages, Dec. 3, 1999, 47 pages.

(Continued)

*Primary Examiner*—Don Wong
*Assistant Examiner*—Andalib F Lodhi
(74) *Attorney, Agent, or Firm*—Fish & Richardson P.C.

(57) ABSTRACT

Methods and apparatus, including computer program products, for generating a name for a business data component in an electronic business process use a received textual description of the business data component. One or more proposed names are generated in accordance with a predefined naming format. The proposed names are generated using a matching algorithm to select terms from a library of available terms based on the textual description. Each proposed name includes multiple terms, and each term in the library of available terms defines an object class, a property, a representation class, or a qualifier.

22 Claims, 9 Drawing Sheets

U.S. PATENT DOCUMENTS

| | | | |
|---|---|---|---|
| 6,226,675 B1 | 5/2001 | Meltzer et al. | |
| 6,363,373 B1 | 3/2002 | Steinkraus | |
| 6,366,917 B1 | 4/2002 | St. John Herbert, III | |
| 6,401,085 B1 * | 6/2002 | Gershman et al. | 707/4 |
| 6,421,681 B1 | 7/2002 | Gartner et al. | |
| 6,490,695 B1 | 12/2002 | Zagorski et al. | |
| 6,535,919 B1 | 3/2003 | Inoue et al. | |
| 6,542,912 B2 | 4/2003 | Meltzer et al. | |
| 6,560,608 B1 | 5/2003 | Tomm et al. | |
| 6,571,239 B1 | 5/2003 | Cole et al. | |
| 6,591,260 B1 | 7/2003 | Schwarzhoff et al. | |
| 6,606,462 B2 | 8/2003 | Siegel et al. | |
| 6,611,726 B1 | 8/2003 | Crosswhite | |
| 6,662,237 B1 | 12/2003 | Leckie | |
| 6,694,338 B1 | 2/2004 | Lindsey | |
| 6,757,739 B1 | 6/2004 | Tomm et al. | |
| 6,775,663 B1 | 8/2004 | Kim | |
| 6,785,538 B2 * | 8/2004 | Nihei | 455/414.1 |
| 6,789,216 B2 | 9/2004 | Zagorski et al. | |
| 6,799,174 B2 | 9/2004 | Chipman et al. | |
| 6,801,201 B2 | 10/2004 | Escher | |
| 6,879,994 B1 | 4/2005 | Matsliach et al. | |
| 6,907,401 B1 | 6/2005 | Vittal et al. | |
| 6,910,182 B2 | 6/2005 | Huang | |
| 6,938,044 B1 | 8/2005 | Milby | |
| 6,941,511 B1 | 9/2005 | Hind et al. | |
| 6,959,416 B2 | 10/2005 | Manning et al. | |
| 6,985,905 B2 | 1/2006 | Prompt et al. | |
| 7,028,312 B1 | 4/2006 | Merrick et al. | |
| 7,058,645 B2 | 6/2006 | Seto et al. | |
| 7,069,020 B2 | 6/2006 | Chung | |
| 7,080,083 B2 | 7/2006 | Kim et al. | |
| 7,127,516 B2 | 10/2006 | Inoue et al. | |
| 7,136,467 B2 | 11/2006 | Brockman et al. | |
| 7,146,399 B2 | 12/2006 | Fox et al. | |
| 7,155,665 B1 | 12/2006 | Browne et al. | |
| 7,181,463 B2 | 2/2007 | Moore et al. | |
| 7,194,695 B1 | 3/2007 | Racine et al. | |
| 7,197,506 B2 | 3/2007 | Wright | |
| 7,225,203 B2 | 5/2007 | Kohno | |
| 7,245,924 B2 | 7/2007 | Katagishi et al. | |
| 7,246,128 B2 | 7/2007 | Jordahl | |
| 7,275,079 B2 | 9/2007 | Brodsky et al. | |
| 7,281,018 B1 | 10/2007 | Begun et al. | |
| 7,313,756 B2 | 12/2007 | Panditharadhya et al. | |
| 7,373,595 B2 | 5/2008 | Jones et al. | |
| 7,421,395 B1 | 9/2008 | Link et al. | |
| 7,533,008 B2 * | 5/2009 | Mangino et al. | 703/6 |
| 2001/0034733 A1 | 10/2001 | Prompt et al. | |
| 2002/0116389 A1 | 8/2002 | Chen et al. | |
| 2002/0116413 A1 | 8/2002 | Clark | |
| 2002/0120506 A1 | 8/2002 | Hagen | |
| 2002/0138583 A1 | 9/2002 | Takayama | |
| 2002/0145944 A1 | 10/2002 | Wright | |
| 2002/0147730 A1 | 10/2002 | Kohno | |
| 2002/0147748 A1 | 10/2002 | Huang et al. | |
| 2002/0178035 A1 * | 11/2002 | Lajouanie | 705/7 |
| 2003/0028857 A1 | 2/2003 | Zagorski et al. | |
| 2003/0069794 A1 | 4/2003 | Hoffman et al. | |
| 2003/0083077 A1 | 5/2003 | Chung | |
| 2003/0120665 A1 | 6/2003 | Fox et al. | |
| 2003/0149934 A1 * | 8/2003 | Worden | 715/513 |
| 2003/0200134 A1 | 10/2003 | Leonard et al. | |
| 2003/0200216 A1 | 10/2003 | Hayes et al. | |
| 2003/0212904 A1 | 11/2003 | Randle et al. | |
| 2004/0034857 A1 * | 2/2004 | Mangino et al. | 718/104 |
| 2004/0083199 A1 | 4/2004 | Govindugari et al. | |
| 2004/0158567 A1 | 8/2004 | Dettinger et al. | |
| 2004/0162871 A1 | 8/2004 | Pabla et al. | |
| 2004/0177160 A1 | 9/2004 | Seto et al. | |
| 2004/0203620 A1 | 10/2004 | Thome et al. | |
| 2004/0205621 A1 | 10/2004 | Johnson et al. | |
| 2004/0254945 A1 | 12/2004 | Schmidt et al. | |
| 2005/0033719 A1 | 2/2005 | Tirpak et al. | |
| 2005/0033768 A1 | 2/2005 | Sayers et al. | |
| 2005/0089129 A1 | 4/2005 | O'Brien et al. | |
| 2005/0091584 A1 | 4/2005 | Bogdan et al. | |
| 2005/0108332 A1 | 5/2005 | Vaschillo et al. | |
| 2005/0144277 A1 | 6/2005 | Flurry et al. | |
| 2005/0160104 A1 | 7/2005 | Meera et al. | |
| 2005/0166223 A1 | 7/2005 | Krasinski | |
| 2005/0198068 A1 | 9/2005 | Mukherjee et al. | |
| 2005/0198074 A1 | 9/2005 | Khayter et al. | |
| 2005/0223060 A1 | 10/2005 | Lueckhoff | |
| 2005/0228803 A1 * | 10/2005 | Farmer et al. | 707/100 |
| 2005/0240875 A1 | 10/2005 | Takayama et al. | |
| 2005/0278372 A1 | 12/2005 | Shaburov et al. | |
| 2006/0025987 A1 * | 2/2006 | Baisley et al. | 704/4 |
| 2006/0036479 A1 * | 2/2006 | Whitmore | 705/10 |
| 2006/0036514 A1 | 2/2006 | Steelberg et al. | |
| 2006/0069677 A1 | 3/2006 | Tanigawa et al. | |
| 2006/0085450 A1 | 4/2006 | Seubert et al. | |
| 2006/0095288 A1 | 5/2006 | Amys et al. | |
| 2006/0101068 A1 | 5/2006 | Stuhec | |
| 2006/0106746 A1 | 5/2006 | Stuhec | |
| 2006/0106824 A1 | 5/2006 | Stuhec | |
| 2006/0136489 A1 | 6/2006 | Thome et al. | |
| 2006/0178868 A1 | 8/2006 | Billerey-Mosier | |
| 2006/0184539 A1 | 8/2006 | Blake et al. | |
| 2006/0218158 A1 | 9/2006 | Stuhec et al. | |
| 2006/0238919 A1 | 10/2006 | Bradley | |
| 2006/0242184 A1 | 10/2006 | Shur et al. | |
| 2006/0253540 A1 | 11/2006 | Hughes | |
| 2006/0259475 A1 | 11/2006 | Dehlinger | |
| 2006/0259912 A1 | 11/2006 | Weinrich et al. | |
| 2006/0288006 A1 | 12/2006 | Eschbach et al. | |
| 2007/0078814 A1 | 4/2007 | Flowers et al. | |
| 2007/0100672 A1 | 5/2007 | McBrida et al. | |
| 2007/0101391 A1 | 5/2007 | Hwang | |
| 2007/0118354 A1 | 5/2007 | Stuhec | |
| 2007/0124320 A1 | 5/2007 | Stuhec | |
| 2007/0150387 A1 | 6/2007 | Seubert et al. | |
| 2007/0150495 A1 | 6/2007 | Koizumi et al. | |
| 2007/0168381 A1 | 7/2007 | Fagin et al. | |
| 2007/0179776 A1 | 8/2007 | Segond et al. | |
| 2007/0203922 A1 | 8/2007 | Thomas | |
| 2007/0260621 A1 | 11/2007 | Smolen et al. | |
| 2007/0288425 A1 | 12/2007 | Fuerst et al. | |
| 2008/0263508 A1 | 10/2008 | Sorensen et al. | |
| 2008/0306984 A1 | 12/2008 | Friedlander et al. | |
| 2009/0037535 A1 | 2/2009 | Stuhec et al. | |

FOREIGN PATENT DOCUMENTS

| | | |
|---|---|---|
| EP | 1293850 | 3/2003 |
| EP | 1424643 | 6/2004 |
| EP | 1793288 | 6/2007 |
| WO | WO 98/40795 | 9/1998 |
| WO | WO 01/53967 | 7/2001 |
| WO | WO 01/55891 | 8/2001 |
| WO | WO 01/63477 | 8/2001 |

OTHER PUBLICATIONS

Kathleen Gundry, SAIC, Namespaces and 11179, Jul. 26, 2002, 40 pages.

UN/CEFACT, ebXML Requirements Specification, Version 1.06, ebXML Requirements Team, May 8, 2001, 43 pages.

UN/CEFACT, ebXML Technical Architecture Specification v1.0.4, ebXML Technical Architecture Project Team, Feb. 16, 2001, 39 pages.

A Complete Family of On-Demand SRM Solutions [online]. Perfect Commerce, 2005. Retrieved from the Internet <URL: www.web.archive.org/web/20060706034828/www.perfect.com/home/index/html>, 2 pages.

Adobe LiveCycle Designer FAQ; Adobe Systems Incorporated; document undated; 3 pages.
Ahmed et al.; "Verification of Data in Staging Schema, Mapping between Source Tables and Materialized Views"; 2005.
APACS—the UK Payments Association [online]. APACS, 2005. Retrieved from the Internet <URL: web.archive.org/web/20060711112524/http://www.apacs.org..uk>, 1 page.
Architecture of Integrated Information System [online]; Wikipedia; retrieved from the Internet <URL: http://en.wikipedia.org/wiki/Architecture_of_integrated_Information_systems>.
BI/Query Queries Guide; Hummingbird, Ltd. [online]; retrieved form the Internet <URL: http://www.notes.queensu.ca/uisadmin.nsf/579a5e3cc0e046c085256833007715cc/$FILE/queries_guide.pdf>; 6 pages.
Brown, P.; "Information Architecture with XML: A Management Strategy"; John Wiley & Sons; Hoboken; 2003.
Business Process Modeling Notation (BPMN) Information [online]; OMG/BPMN; retrieved from the Internet <URL: http://web.archive.org/web/20061011235521/http://www.bpmn.org>.
Celko, Joe; "Joe Celko's SQL for Smarties: Advanced SQL Programming"; 2nd Edition; 2000.
Chen et al.; "Managing Semantic Metadata for the Semantic Grid"; Proceedings of the Knowledge Grid and Grid Intelligence Workshop; Beijing, China; 2004; 9 pages.
CIDX-Open Standards that Open Markets [online] CIDX, 2006. Retrieved from the Internet <URL: www.web.archive.org/web/20060708031302/http://www.cidx.org>, 2 pages.
Contivo VMS [online]; retrieved from the Internet <URL: http://www.contivo.com/contivovms.html>.
Core Components Technical Specification—Part 8 of the ebXML Framework [online]; UN/CEFACT; 2003; retrieved from the Internet <URL: http://www.unece.org/cefact/ebxml/CCTS_V2-01_Final.pdf>, 113 pages.
Core Components Technical Specification v2.01—Part 8 of the ebXML Framework; UN/CEFACT; Nov. 15, 2003; pp. 1-113.
Crawford, Mark (Lead Ed.); "Oasis Universal Business Language (UBL) Naming and Design Rules"; Nov. 15, 2004.
Davis, J.; "Context Tailor: Towards a Programming Model for Context-Aware Computing" International Middleware Conference Workshop Proceedings—Middleware for Pervasive and Ad Hoc Computing; Jun. 16-20, 2003; Rio de Janeiro, Brazil; pp. 68-75.
Decker, S. et al.; "ONTOBROKER: Ontology-based Access to a Distributed and Semi-Structured Information"; Kluwer Academic Publishers; 1998; pp. 1-20.
Designing Interfaces and Proxy Generation [online]; SAP; retrieved from the Internet <URL: http://help.sap.com/saphelp_nw2004s/helpdata/en/ba/d4c23b95c8466ce10000000a114084/>; 2 pages.
Do et al.; "COMA—A System for Flexible Combination of Schema Matching Approaches"; Proceedings of the 28th VLDB Conference; Hong Kong; 2002; 12 pages.
Driving Automated Integration Today [online]; Contivo; retrieved from the Internet <URL: http://web.archive.org/web/20061017222738/http:/www.contivo.com/index/html>.
ebXML Business Process Specification Schema Version 1.01 [online]; Oasis; 2001; retrieved from the Internet <URL: http://www.ebxml.org/specs/ebBPSS.pdf>.
Embley et al.; "Automatic Direct and Indirect Schema Mapping: Experiences and Lessons Learned"; Dec. 2004.
Erhard, Rahm et al.; "A Survey of Approaches to Automatic Schema Matching"; Springer-Verlag, The VLDB Journal 10; Feb. 5, 2001.
Final Committee Draft ISO/IEC FCD—Information Technology—Metadata Registries (MDR)—Part 5—Naming and Identification Principles; ISO/IEC document dated Jan. 8, 2004; 26 pages.
FlexiSoft Solutions; retrieved from the Internet <URL: httpp://www.flexisoftsolutions.com/Products/SM2004/SM2004.aspx>; 4 pages.
Garvey, P. and French, B.; "Generating User Interfaces from Composite Schemas"; Proceedings of XML 2003; Philadelphia, Pennsylvania; Dec. 2003.
GEFED EDIFIX; "EDIFIX Functions" [online]; Xenos; 2002; retrieved from the Internet <URL: http://www.gefeg.com/en/edifix/fx_functions.htm>.
GoXML Registry [online]; Xenos; 2002; retrieved from the Internet <URL: http://www.xmlglobabl.com/solutions/prod_goxml_registry.asp>.
Goyal; "An XML Schema Naming Assister for Elements and Types"; National Institute of Standards and Technology; retrieved from the Internet <URL: http://www.mel.nist.gov/msidlibrary/doc/NISTIR7143.pdf>; 12 pages.
Gundry, Kathleen; SAIC, Namespaces and 11179; Jul. 26, 2002; 40 pages.
How to Solve the Business Standards Dilemma—CCTS Key Model Concepts; The SAP Developer Network; SAP AG, 2006; pp. 1-18.
How to Solve the Business Standards Dilemma—The Context Driven Business Exchange; The SAP Developer Network; SAG AG 2005; pp. 1-19.
InfoPath 2003 Product Overview; Microsoft Office Online; retrieved from the Internet <URL: http://www.microsoft.com/office/infopath/prodinfo/overview.mspx>.
Information Technology—Metadata Registries (MDR) - Part 2: Classification; International Standard ISO/IEC 11179-2; Nov. 15, 2005; 16 pages.
Information Technology—Metadata Registries (MDR)—Part 1: Framework; International Standard ISO/IEC 11179-1; Sep. 15, 2004; 32 pages.
Information Technology—Metadata Registries (MDR)—Part 3: Registry Metamodel and Basic Attributes; International Standard ISO/IEC 11179-3; Feb. 15, 2003; 108 pages.
Information Technology—Metadata Registries (MDR)—Part 4: Formulation of Data Definitions; International Standard ISO/IEC 11179-04; Jul. 15, 2004; 16 pages.
Information Technology—Metadata Registries (MDR)—Part 5: Naming and Identification Principles; International Standard ISO/IEC 11179-5; Sep. 1, 2005; 20 pages.
Information Technology—Metadata Registries (MDR)—Part 6: Registration; International Standard ISO/IEC 11179-6; Jan. 15, 2005.
Information Technology—Specification and Standardization of Data Elements—Part 5: Naming and Identification Principles for Data Elements; ISO/IEC document dated Dec. 1, 1995; 20 pages.
ISO/DTS 15000-5:2006 Core Components Technical Specification 2nd Edition UN/CEFACT Version 2.2; Mar. 31, 2006.
ISO/IEC 11179 International Standard-Information Technology: Specification and Standardization of Data Elements (Part 5: Naming and Identification Principles for Data Elements), First Edition, Dec. 1, 1995.
ISO/IEC 11179-4 Information Technology—Specification and Standardization of Data Elements (Part 4: Rules and Guidelines for the Formulation of Data Definitions); 1995.
ISO/IEC 13250, Topic Maps, Information Technology, Document Description and Processing Languages; Dec. 3, 1999; 47 pages.
Jurgensen, T.; "Report on Contivo Product Workshop made by Contivo, C.A.S. and SAPMarkets"; SAP Markets, Product Workshop on Contivo; St. Leon Rot; Aug. 1-2, 2001; 5 pages.
Kesseler; "A Schema Based Approach to HTML Authoring"; Aug. 2000; pp. 1-17.
Kifer, M. et al.; "Logical Foundations of Object-Oriented and Frame-Based Languages"; J. Assoc Computing Machinery; May 1995; pp. 1-100.
Kifer, M.; "F-Logic: A Higher-Order Language for Reasoning about Objects, Inheritance, and Scheme"; Jun. 3, 1997; pp. 1-21.
Know How to Use Know-How [online]. Ontoprise, 2006. Retrieved from the Internet <URL: http://web.archive.org/web/20060208064330/www.ontoprise.de/content/index_eng.html>.
Lay, P. and Luttringhaus-Kappel, S.; "Transforming XML Schemas into Java Swing Guls"; GI Jahrestagung (1) Sep. 20-24, 2004.
Mesba, Ali; "Web-Based XML Editing with W3C XML Schema and XSLT"; Apr. 30, 2003; pp. 1-6 (Doc. A) and 1-6 (Doc. B).
Message Type [online]; SAP; retrieved from the Internet <URL: http://help.sap.com.saphelp_nw2004s/helpdata/en/2d/c0633c3a892251e10000000a114084>; 2 pages.
Novell Xforms Stratgy; White Paper; Feb. 26, 2003; http://www.nmpub.com/eforms/onfolio-files/Novell%20Xform%20Strategy.pdf.

Oasis ebXML Registry TC [online]; Oasis; 2005; retrieved from the Internet <URL: http://www.oasis-open.org/committees/tc_home.php?wg_abbrev=regrep>.
Oasis Universal Business Language (UBL) TC [online]. Oasis. Retrieved from the Internet <URL: www.oasis-open.open.org/committees/tc_home/php?wh_abbrev=ubl>, 7 pages.
Office Action issued in U.S. Appl. No. 11/063,000 on Oct. 9, 2008; 16 pages.
Office Action issued in U.S. Appl. No. 11/063,000 on Apr. 17, 2009; 18 pages.
Office Action issued in U.S. Appl. No. 11/063,000 on Sep. 3, 2009; 16 pages.
Office Action issued in U.S. Appl. No. 11/063,000 on Apr. 14, 2010; 19 pages.
Office Action issued in U.S. Appl. No. 11/087,918 on Aug. 14, 2008; 20 pages.
Office Action issued in U.S. Appl. No. 11/087,918 on Jan. 28, 2008; 22 pages.
Office Action issued in U.S. Appl. No. 11/087,918 on Jul. 10, 2007; 18 pages.
Office Action issued in U.S. Appl. No. 11/087,918 on Jun. 9, 2009; 27 pages.
Office Action issued in U.S. Appl. No. 11/087,918 on Oct. 28, 2008; 25 pages.
Office Action issued in U.S. Appl. No. 11/088,158 on Jan. 25, 2008; 19 pages.
Office Action issued in U.S. Appl. No. 11/088,158 on Jul. 1, 2008; 18 pages.
Office Action issued in U.S. Appl. No. 11/088,158 on Jul. 18, 2007; 13 pages.
Office Action issued in U.S. Appl. No. 11/088,158 on Nov. 25, 2008; 21 pages.
Office Action issued in U.S. Appl. No. 11/285,368 on Apr. 4, 2008; 17 pages.
Office Action issued in U.S. Appl. No. 11/285,368 on Dec. 1, 2008; 17 pages.
Office Action issued in U.S. Appl. No. 11/285,368 on Jun. 3, 2009; 17 pages.
Office Action issued in U.S. Appl. No. 11/285,368 on Nov. 9, 2007; 12 pages.
Office Action issued in U.S. Appl. No. 11/285,368 on Oct. 21, 2009; 19 pages.
Notice of Allowance issued in U.S. Appl. No. 11/285,368 on Apr. 6, 2010; 16 pages.
Notice of Allowance issued in U.S. Appl. No. 11/285,368 on Jun. 25, 2010; 4 pages.
Office Action issued in U.S. Appl. No. 11/286,762 on Dec. 11, 2008; 28 pages.
Office Action issued in U.S. Appl. No. 11/286,762 on Jun. 23, 2008; 24 pages.
Office Action issued in U.S. Appl. No. 11/286,762 on Dec. 11, 2007; 22 pages.
Notice of Allowance issued in U.S. Appl. No. 11/286,762 on Jul. 13, 2009; 8 pages.
Office Action issued in U.S. Appl. No. 11/291,327 on Apr. 17, 2008; 16 pages.
Office Action issued in U.S. Appl. No. 11/291,327 on Mar. 6, 2009; 14 pages.
Office Action issued in U.S. Appl. No. 11/291,327 on Nov. 14, 2007; 7 pages.
Office Action issued in U.S. Appl. No. 11/291,327 on Oct. 2, 2008; 20 pages.
Office Action issued in U.S. Appl. No. 11/291,327 on Jul. 9, 2009; 19 pages.
Notice of Allowance issued in U.S. Appl. No. 11/291,327 on Jan. 21, 2010; 4 pages.
Office Action issued in U.S. Appl. No. 11/400,837 on Apr. 21, 2009; 12 pages.
Office Action issued in U.S. Appl. No. 11/400,837 on Nov. 14, 2008; 13 pages.
Office Action issued in U.S. Appl. No. 11/400,837 on Dec. 31, 2009; 13 pages.
Office Action issued in U.S. Appl. No. 11/618,529 on Dec. 8, 2008; 9 pages.
Office Action issued in U.S. Appl. No. 11/618,529 on Jun. 3, 2009; 8 pages.
Office Action issued in U.S. Appl. No. 11/618,529 on Aug. 3, 2009; 7 pages.
Notice of Allowance issued in U.S. Appl. No. 11/618,529 on Jan. 15, 2010; 7 pages.
Office Action issued in U.S. Appl. No. 11/445,130 on Oct. 28, 2009; 15 pages.
Office Action issued in U.S. Appl. No. 11/445,130 on Mar. 31, 2010; 15 pages.
Office Action issued in U.S. Appl. No. 11/618,449 on Mar. 25, 2010; 15 pages.
Office Action issued in U.S. Appl. No. 11/981,454 on Jun. 3, 2010; 20 pages.
Office Action issued in U.S. Appl. No. 11/981,454 on Dec. 22, 2009; 23 pages.
Office Action issued in U.S. Appl. No. 11/780,907 on Dec. 1, 2009; 14 pages.
Office Action issued in U.S. Appl. No. 11/780,907 on Jul. 27, 2009; 5 pages.
Office Action issued in U.S. Appl. No. 11/776,981 on Mar. 31, 2010; 16 pages.
Advisory Action issued in U.S. Appl. No. 11/776,981 on Feb. 25, 2010; 2 pages.
Office Action issued in U.S. Appl. No. 11/776,981 on Dec. 9, 2009; 15 pages.
Office Action issued in U.S. Appl. No. 11/776,981 on Jul. 8, 2009; 11 pages.
Office Action issued in U.S. Appl. No. 10/986,628 on May 17, 2007; 22 pages.
Office Action issued in U.S. Appl. No. 10/986,628 on Nov. 6, 2007; 20 pages.
Office Action issued in U.S. Appl. No. 10/986,628 on Apr. 24, 2008; 22 pages.
Office Action issued in U.S. Appl. No. 10/986,628 on Aug. 15, 2008; 33 pages.
Office Action issued in U.S. Appl. No. 10/986,628 on Jan. 9, 2009; 30 pages.
Notice of Allowance issued in U.S. Appl. No. 10/986,628 on Jun. 3, 2009; 17 pages.
Notice of Allowance issued in U.S. Appl. No. 10/986,628 on Oct. 9, 2009; 4 pages.
Office Action issued in European Application No. 06023849.0 on May 25, 2009; 3 pages.
Office Action issued in European Application No. 06023849.0 on Feb. 18, 2010; 3 pages.
Office Action issued in European Application No. 06023585.0 on Apr. 22, 2010; 5 pages.
Office Action issued in European Application No. 05787252.5 on Apr. 2, 2009; 7 pages.
OntoBroker—The Power of Inferencing [online]. Ontoprise, 2005. Retrieved from the Internet <URL: http://web.archive.org/web/20051122071757/www.ontoprise.de/content/e3/e27/index_eng>.
OntoMap Light-Weigth Ontology Management Platform [online]; Sirma, 1993-2005; retrieved from the Internet <URL: http://www.ontotext.com/projects/ontomap.html>.
Open Applications Group: Standards for Business Software Interoperability [online]. OAGi. Retrieved from the Internet <URL: www.web.archive.org/web/20060616190904/http:openapplications.org>, 3 pages.
Peng, J. et al.; "A Reference Data Model for NEESgrid Shake Table Experiments"; Proceedings of the International Symposium on Earthquake Engineering in the Past and Future Fifty Years; 2004; 10 pages.
Project: ebXML Registry/Repository: Summary [online]; SourceForge.net, 2005; retrieved from the Internet <URL: http://sourceforge.net/projects/ebsmlrr>.
RosettaNet Standards [online]. Rosettanet, 1998-2007. Retrieve from the Internet: <URL: www.portal.rosettanet.org/cms/sites/RosettaNet/Standards/RStandards/index.html>, 2 pages.

SAP Exchange Infrastructure; SAP; retrieved from the Internet <URL: http://help.sap.com/saphelp_erp2004/helpdata/en/0f/80243b4a66ae0ce10000000a11402f/c...>.

Searle, John R.; "Chomsky's Revolution in Linguistics"; The New York Review of Books; Jun. 29, 1972.

Search Report issued in European Application No. 06023849.0 on Mar. 22, 2007; 7 pages.

Search Report issued in European Application No. 06023585.0 on Feb. 22, 2007; 7 pages.

Search Report issued in European Application No. 06022546.3 on Mar. 15, 2007; 6 pages.

Search Report issued in European Application No. 06022715.4 on Jan. 22, 2007; 8 pages.

Schuldt, Ron; "Universal Data Element Framework (UDEF) Overview"; Open Group; San Francisco, CA; Jan. 24-28, 2005; 31 pages.

Schuldt, Ron and Chan, Sally; "Universal Data Element Framework (UDEF)"; Oasis-Universal Business Language; PowerPoint presentation dated Nov. 21, 2002; pp. 1-70.

Scroth, C.; "CCTS-Based Business Information Modeling for Increasing Cross-Organization Interoperability" Springer London; Aug. 29, 2007; pp. 467-478.

Stitzer, Alan; "UN/CEFACT (Core Components Technical Specification—Part 8 of the ebXML Framework)"; Nov. 15, 2003; Version 2.01.

Stuhec, G. and Crawford, M.; "How to Solve the Business Standards Dilemma—The CCTS Standards Stack"; SAP AG, 2006; pp. 1-13.

Stuhec, G.; "How to Solve the Business Standards Dilemma—The CCTS Based Core Data Types"; SAP AG, 2006; pp. 1-22.

Tao et al.; "Applying the Semantic Web to Manage Knowledge on the Grid"; E-Science AHM; Nottingham, England; 2004; 8 pages.

Tao et al.; "Semantic Web Based Content Enrichment and Knowledge Reuse in E-Science"; On the Move to Meaningful Internet Systems 2004: CoopIS, DOA, and ODBASE; 2004; 14:654-699.

The Company of the Open Standard Solutions [online]; ebXMLsoft, Inc.; 2001-2004; retrieved from the Internet <URL: http://www.ebsmlsoft.com>.

UN/CEFACT; "Core Components Technical Specification—Part 8 of the ebXML Framework" [oneline]; Nov. 15, 2003; retrieved from the Internet <URL: http://www.unece.org/cefact/ebxml/CCTSV2-01_Final.pdf>; pp. 1-113.

UN/CEFACT's Modeling Methodology (UMM) in a Nutshell; undated manuscript, believed to have been published Nov. 15, 2006; retrieved from the Internet <URL: http://www.untmg.org/index.php?option=com_docman@task=docclick&Itemid=137&bid=55&limitstart=0&limit=5>.

UN/CEFACT's Modeling Methodology (UMM): UMM Meta Model—Foundation Module Version 1.0 Technical Specification [online]; CEFACT Oct. 6, 2006; retrieved from the Internet <URL: http://www.unece.org/cefact/umm/UMM_Foundation_Module.pdf>.

UN/CEFACT XML Naming and Design Rules; Version 2.0; Feb. 17, 2006.

Universal Data Element Framwork (UDEF) [online]; Oasis; May 23, 2005; retrieved from the Internet <URL: http://xml.coverpages.org/udef.html>.

xCBL 4.0 Final Release Now Available [online]. xCBL, 2000 Retrieved from the Internet: <URL: www.web.archive.org/web/20060619154652/http://www.xcbl.org>, 3 pages.

XForms—The Next Generation of Web Forms; W3C; Retrieved from the Internet <URL: http://www.w3.org/MarkUp/Forms>; 11 pages.

XForms 1.1,; W3C Working Draft Nov. 15, 2004; retrieved from the Internet <URL: http://www.w3.org.TR/2004/WD-xforms11-20041115>; 26 pages.

XForms 1.0-W3C Recommendation Oct. 14, 2003; edited by M. Dubinko et al; http://www.w3.org/TR/2003/REC-xforms-20031014.

XML Path Language (XPath) Version 1.0; W3C Recommendation; Nov. 16, 1999; W3C; retrieved from the Internet <URL: http://www.w3.org/TR/xpath>; 37 pages.

XML Schema; W3C; retrieved from the Internet <URL: http://www.w3.org/XML/Schema>; 16 pages.

XML Schema, Part 2: Datatypes Second Edition [online]; W3C; 2004; retrieved from the Internet <URL: http://www.w3.org/TR/2004/REC-xmlschema-2-20041028>; 194 pages.

Trade Secret Material Not Open to Public. To be Opened Only by Examiner or Other Authorized U.S. Patent and Trademark Office Employee (filed by Express Mail in the present Application on Jul. 1, 2009).

* cited by examiner

USING A CONTROLLED VOCABULARY LIBRARY TO GENERATE BUSINESS DATA COMPONENT NAMES

BACKGROUND

The present invention relates to data processing by digital computer, and more particularly to using a controlled vocabulary library to generate business data component names.

Companies have conventionally exchanged electronic business information using Electronic Data Interchange (EDI). While EDI has allowed companies to communicate more efficiently than through the use of traditional paper-based communications, smaller companies face challenges to participate in electronic business (or electronic collaboration). These companies need to invest in complex and expensive computer systems to be installed at local computers, or to register with marketplaces at remote computers accessible through the Internet. In either case, the companies are bound by the particulars of the local or remote computer systems. Changes lead to further costs for software, hardware, user training, registration, and the like.

More recently, the development of the Extensible Markup Language (XML) has offered an alternative way to define formats for exchanging business data. XML provides a syntax that can be used to enable more open and flexible applications for conducting electronic business transactions, but does not provide standardized semantics for messages used in business processes. Initiatives to define standardized frameworks for using XML to exchange electronic business data have produced specifications such as the Electronic Business Extensible Markup Language (UN/CEFACT/ebXML) Core Components Technical Specification (CCTS) and ISO 11179. The UN/CEFACT/ebXML CCTS generally provides a methodology for describing reusable building blocks ("core components") for business transactions, creating new business vocabularies, and storing core component definitions in central registries. ISO 11179, which is incorporated in the UN/CEFACT/ebXML CCTS, provides a naming convention for standardizing the structure and semantics of core components.

SUMMARY OF THE INVENTION

The present invention provides methods and apparatus, including computer program products, that implement techniques for generating business data component names.

In one general aspect, the techniques feature receiving a textual description of a business data component and generating one or more proposed names for the business data component based on the textual description. Each proposed name is generated in accordance with a predefined naming format using a matching algorithm to select terms from a library of available terms. Each proposed name includes multiple terms, and each term in the library of available terms defines an object class (and possibly at least one additional object class qualifier), a property (and possibly at least one additional property qualifier), and/or a representation class.

The invention can be implemented to include one or more of the following advantageous features. Each proposed name includes no more than one term corresponding to each of an object class, object class qualifier, a property, property qualifier, and/or a representation class. Context information for defining the business data component is received, and a predefined business process model is identified based on the context driver information, which is based on a context category and a context value. A request to add the business data component to the business process model is received, and the matching algorithm uses a context defined by the context information and/or the predefined business process model to select terms from the library of available terms. The proposed names include a business data component name included in a business process model for a different context. A topic map defines associations between a set of business process models that include the predefined business process model and the business process model for the different context. The business process model for the different context is identified based on a relationship with the predefined business process model as defined in the topic map. The business process model is modified to include a selected one of the proposed names.

The textual description includes a description of an object class (and possibly at least one additional object class qualifier), a property (and possibly at least one additional property qualifier term, and/or a representation class. The library of available terms defines associations between terms and the proposed names for the business data component are generated based on the defined associations between terms. The proposed names include an object class term, a property term, and a representation class term. The proposed names can further include one or more qualifier terms associated with the object class term, the property term, and/or the representation class term. The library of available terms includes a topic map of terms included in predefined business data component names. The topic map defines associations between terms and predefined business data component names included in a set of business process models. A business process model is modified to include a selected proposed name for a component added to the business process model. The matching algorithm selects terms using the topic map to combine terms to generate each proposed name. In addition, the matching algorithm selects terms based on a constraint, a characteristic, one or more valid values, and/or a specified context for the business data component.

The terms included in the name semantically describe the business data component. The terms are selected based on a correspondence between the description and a semantic meaning of the selected terms. A topic map defines the available terms and associations between the available terms. Each term in the topic map corresponds to a topic and each topic is associated with at least one other topic. Each topic corresponding to a term includes elements defining an occurrence of the term, another topic of which the term is an instance, and/or a scope associated with the term.

The invention can be implemented to realize one or more of the following advantages. A controlled vocabulary library can be used to propose component names that include preferred terms, which can help maintain consistency in naming components. In other words, the controlled vocabulary library can help ensure that components with the same or highly similar semantic meanings consistently use the same terms. For example, the controlled vocabulary library can help ensure that similar components in different contexts (e.g., address components in the automobile and chemical industries) use consistent naming terminology. Proposed names can be automatically generated based on requirements that are semantically defined by a user using human readable (e.g., English, German, and the like) sentences, phrases, or other descriptions. The controlled vocabulary library can be used to identify synonyms of words used in the human readable description to help find preferred terms. The proposed names can be based on names for existing components and can include names that exist in other contexts or new names not previously defined that may be modeled after an existing name in the same or another context. The proposed names can also be based on relationships between terms that are defined in the controlled vocabulary library (e.g., using a topic map contained in the controlled vocabulary library in which each term is a topic and relationships are defined between topics). Proposed names can include terms that provide an easy to understand semantic meaning for the corresponding component. Proposed names can be generated so as to comply with the naming requirements of UN/CEFACT/ebXML CCTS, Web Ontology Language (OWL), and/or ISO 11179. The user can select from among multiple proposed names and is not necessarily restricted to the proposed name but can modify a selected name, if desired. New component names can be created for use in an LN/CEFACT/ebXML CCTS registry and/or in an intermediary structure that is used for mapping components between different electronic business processes. Existing components from which new component names are generated can be used to provide a model for the structure of the new component. Additional advantages include avery close relationship between the documentation of BIEs and the Dictionary Entry Names; reuse of component parts of sentences, which are already stored as associations, for the automatic completeness of documentation; categorization of topics, associations, and occurrences by the context driver mechanism to get a more precise result in Dictionary Entry Names; and searching of already defined terms through the usage of topic maps.

Implementations of the invention can provide one or more of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In general, electronic business communications can be conducted using electronic documents. An electronic document does not necessarily correspond to a file. A document may be stored in a portion of a file that holds other documents, in a single file dedicated to the document in question, or in multiple coordinated files. Electronic documents can be constructed using business information entities. A business information entity (BIE) is an element of business data or a collection of business data with a unique business semantic definition and can include a Basic Business Information Entity (BBIE), an Association Business Information Entity (ASBIE), or an Aggregate Business Information Entity (ABIE). A BBIE represents a characteristic (e.g., a street address) of a specific object class in a specific business context and corresponds to a data type that describes valid values for the BBIE. An ASBIE represents a complex characteristic of a specific object class in a specific business context and is used to associate BIEs with one another (e.g., to associate a person with an address). The ASBIE is based on an ABIE. An ABIE represents an object class and is a collection of related pieces of business information (e.g., an address that includes a street address, a city, a postal code, and a country) in a specific business context. In general, an ABIE includes one or more BBIEs and one or more ASBIEs. Core components provide more generic building blocks from which BIEs can be created. For example, an aggregate core component provides a structure for creating an ABIE in a specific business context.

Each BIE, core component, business context, data type, or other component in an electronic business framework typically includes a unique name, which can include multiple concatenated terms that describe characteristics of the component. For example, ISO 11179 defines a naming convention in which each data element is described by a name that includes three primary terms: an object class term, a property term, and a representation class term. The object class term identifies a basic concept underlying a data element (e.g., address or party). Generally, the object class term describes an ABIE, which includes multiple properties and/or representations. The property term identifies a characteristic (e.g., street or company) of the object class. The representation class term categorizes the format (e.g., text or code) of the data element. In some business contexts, a particular element may have only one representation, in which case the name for the element does not need to include a representation class term. The object class term, property term, and representation class term can each have an associated qualifier that further refines the base term. For example, an object class term "address" can be refined by the qualifier "buyer" and a property term "company" can be refined by the qualifier "parent."

Figure 1:
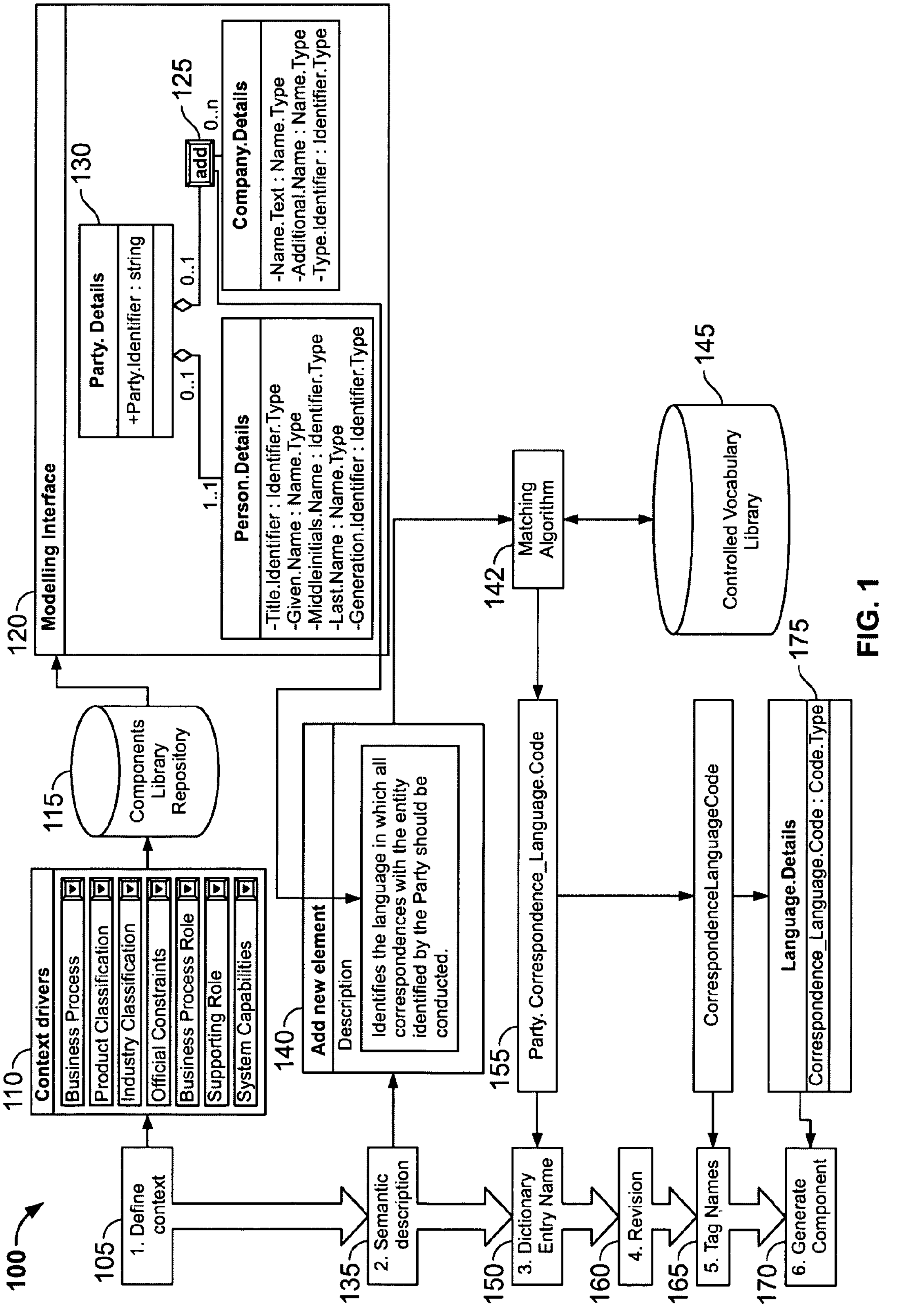
FIG. 1 is a block diagram illustrating a process for adding a business component to a repository.

FIG. 1 is a block diagram that illustrates a process 100 for adding a business component to a repository. Initially, a business context in which a user wishes to view, modify, or add one or more business information entities is defined (105). A user can select from predefined sets of context categories and context values, displayed on a context definition user interface 110, according to the requirements of a business component to be added. For example, the context can be defined using context drivers defined in UN/CEFACT/ebXML CCTS. The user can specify a particular business process classification, product classification, industry classification, geopolitical context, legal or contractual constraints, business process role, supporting role, and/or system capabilities.

The defined business context is used to identify one or more business process models 120 from a components library repository 115. The components library repository 115 stores definitions of components that model business contexts, business messages, business objects, data types, BIEs, core components, associations between business objects, and the like. Thus, some components can represent a singular business characteristic (e.g., a BBIE or a data type) while other components can represent an aggregation of other components (e.g., an ABIE or a business message, which can include multiple ABIEs, ASBIEs, and a structure within which they are used). Each component can be defined by a particular structure and can include various elements, such as context categories, dictionary entry names (i.e., unique names for each component), properties, BIEs, elements, annotations, unique identifiers, data types, and associations between elements. The components library repository can include UN/CEFACT/ebXML CCTS registries, repositories of components for standardized business process frameworks, and/or repositories of components for proprietary business process frameworks.

Business process models 120 are generally defined using XML metadata but can be translated using XML Metadata Interchange (XMI) and presented to a user in the form of a Unified Modeling Language (UML) class diagram. If more than one business process model 120 is identified from the components library repository, a user can select a particular business process model 120. In many cases, the defined business context can allow a single business process model 120 to be automatically selected. A user can select an option 125 to add an element or component for satisfying additional requirements using a user interface that displays a UML class diagram for the selected business process model 120. In the illustrated example, the user selects an option to add an element to a party details object class 130. The element or component to be added can be, for example, an ABIE, a BBIE, or an ASBIE. The added element or component will be represented only in a specific context, which is defined by the context categories and their context values.

A semantic description for the describing the business requirements of the element to be added is received (135) from the user through a user interface 140. The semantic description of the business requirement can be in the form of a natural language sentence (i.e., a sentence that at least nominally complies with the rules of grammar for a particular language (e.g., English) or can be in the form of text that, although not using proper grammar, provides a semantic description of the element, such as a proposed name for the element in which the terms included in the name are selected from a natural language, such as English or German. A matching algorithm 142 uses the semantic description to identify terms contained in a controlled vocabulary library 145 and to assemble the terms to generate (150) one or more proposed UN/CEFACT/ebXML CCTS based dictionary entry names 155.

The terms in the controlled vocabulary library 145 are categorized according to type, such as object class terms, property terms, representation class terms, and qualifiers. Some terms in the controlled vocabulary library 145 can have more than one type. For example, the term "party" can in some situations be used as an object class term and in other situations be used as a property term. In addition, the terms in the controlled vocabulary library 145 include associations with other terms. For example, the controlled vocabulary library 145 associates terms that can be used together to form a dictionary entry name. The associations of terms can be based on terms that have been used together to form a name for a previously defined component in another business context (i.e., a component that exists in the components library repository 115). The associations of terms can also be based on predefined links between terms that have some commonality of subject matter, more general object classes, and the like. For example, an object class term for a particular object class might be linked to a property term used in another object class because both object classes are instances of related higher level object classes.

The terms in the controlled vocabulary library 145 can be represented as topics in a topic map architecture. Each term corresponds to a topic and the topic map defines relationships between terms. A topic map can be stored in XML format and represented using UML class diagrams. Topic maps make it possible for a machine to navigate among terms and their occurrences in the components library repository 115. The topic map for the controlled vocabulary library 145 can include additional information about terms, such as synonyms, definitions, and how terms relate to various business contexts. Each topic can be an instance of a topic type. Each topic corresponds to a term type in the ISO 11179 standard. Topics within a topic map can also play different roles in different associations and can include references to external sources, such as web pages, that provide additional information about a topic. Incorporating the controlled vocabulary library 145 into a topic map allows matching algorithms to identify terms that are most likely to correspond to a meaning of the semantic description.

Topic maps can be implemented according to ISO/IEC 13250:2000, which provides a standardized notation for representing the structure of information resources used to define topics and relationships between topics. Each topic in a topic map that represents the available terms can specify a term type (e.g., object class, property, representation class, or qualifier) of which the term is an instance, identify the subject of the term or topic, specify occurrences of the term or topic (i.e., in the components library repository 115), reference other topics or terms that are combined in an existing dictionary entry name, and define the scope and context of the term or topic. The topic map includes associations between topics or terms. Associations can include elements that specify an association type, member topics or terms in the association, and a role played by each topic or term in the association.

Once a proposed dictionary entry name 155 is generated (150), the user can revise (160) the dictionary entry name as necessary. A tag name can be generated (165), and a business data component 175 corresponding to the dictionary entry name 155 can be constructed (170). In some cases, the structure of the business data component can be constructed in at least a partially automated manner by using the structure of similarly named components in other contexts.

Figure 2:
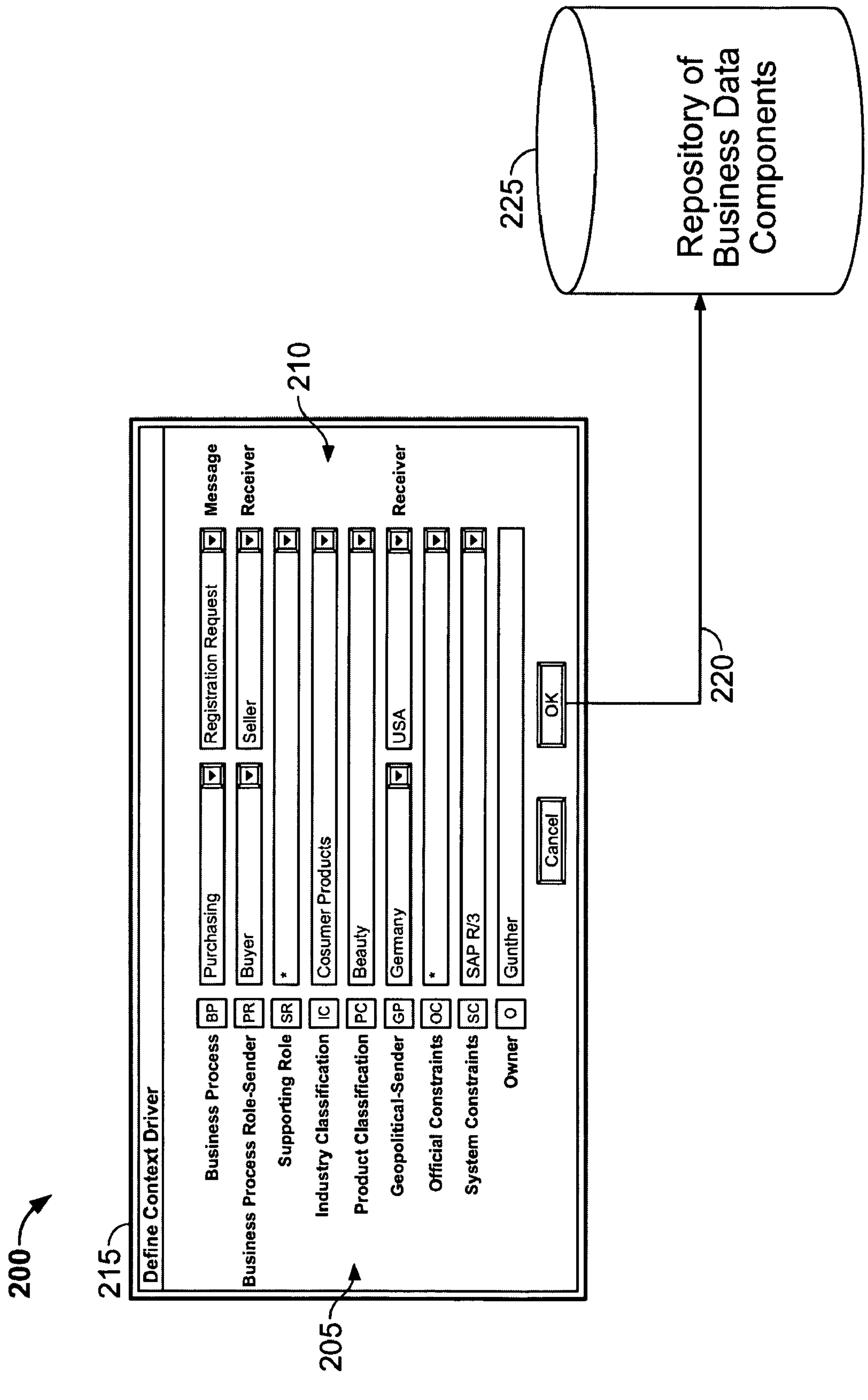
FIG. 2 illustrates a process for defining a business context.

FIG. 2 is a more detailed illustration of a process 200 for defining a business context by the context categories and their context values. A user selects from available options for one or more context drivers 205 using drop down menus 210 in a context definition user interface 215. The user selects options based on the specific requirements for the business data component or components to be viewed, modified, or added. Once the user submits the selected options, a repository of business data components 225 is queried (220) to identify one or more models that correspond to the selected context options. The repository of business data components includes, for example, components that can be combined to form aggregate components and aggregate components that can be combined for use in business processes.

Figure 3:
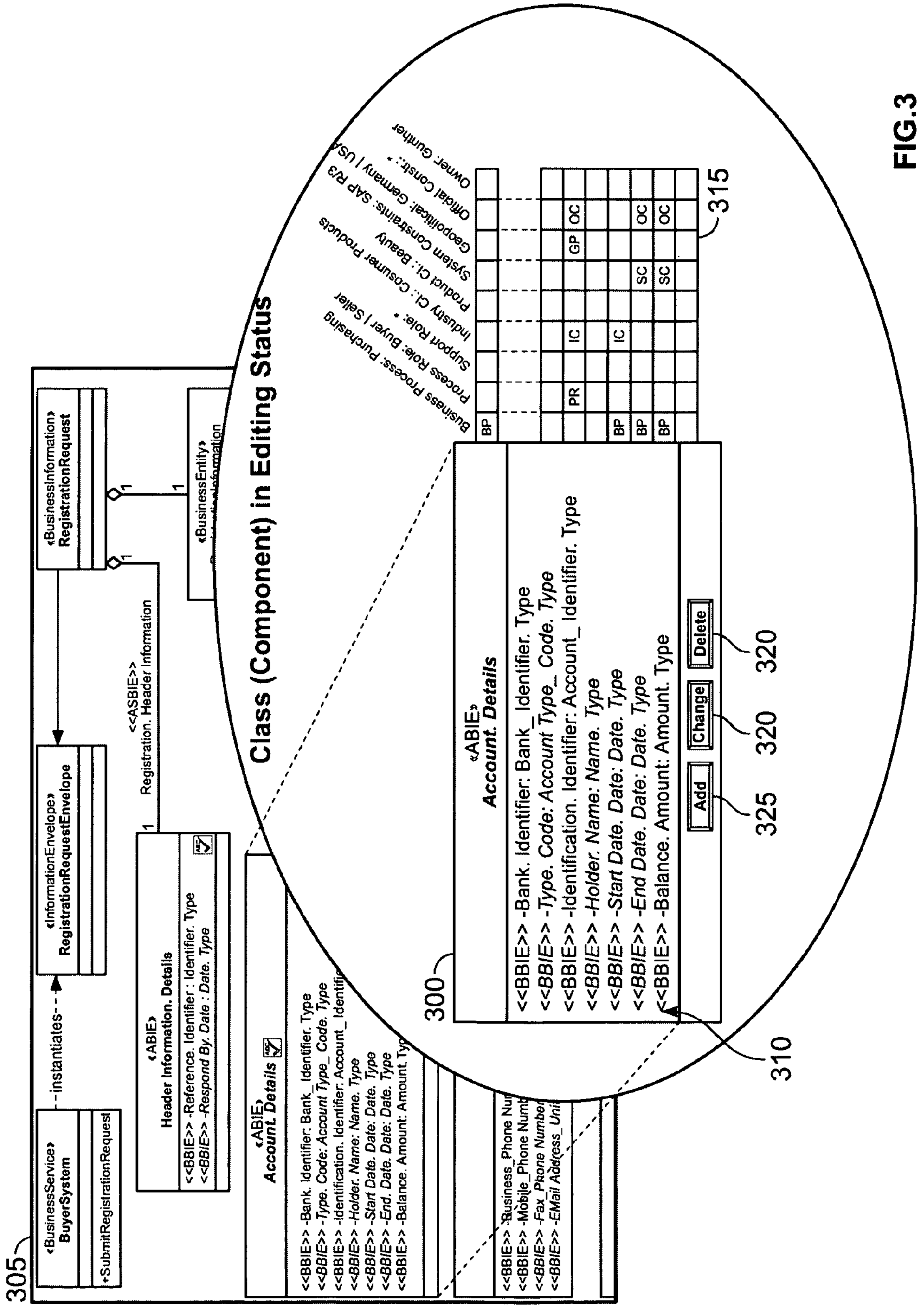
FIG. 3 is an inset view of an aggregate business information entity (ABIE) in a Unified Modeling Language (UML) class diagram.

FIG. 3 is an inset view of an ABIE 300 in a UML class diagram 305. The ABIE 300 is identified from a repository of business data components based on submitted context information. The ABIE 300 includes multiple BBIEs 310, some of which maybe applicable only in specific contexts. For example, as indicated in chart 315, the BBIE "End Date" is limited by the context categories and their context values to only certain business processes, system constraints, and official constraints. In addition to buttons 320 that allow a user to change or delete the ABIE 300 or one or more BBIEs 310, an add button 325 allows a user to add a new BBIE 310 to the ABIE 300. All these features can be performed in the defined context. When a user opts to add a new component, the user is presented with another user interface for describing the new component.

Figure 4:
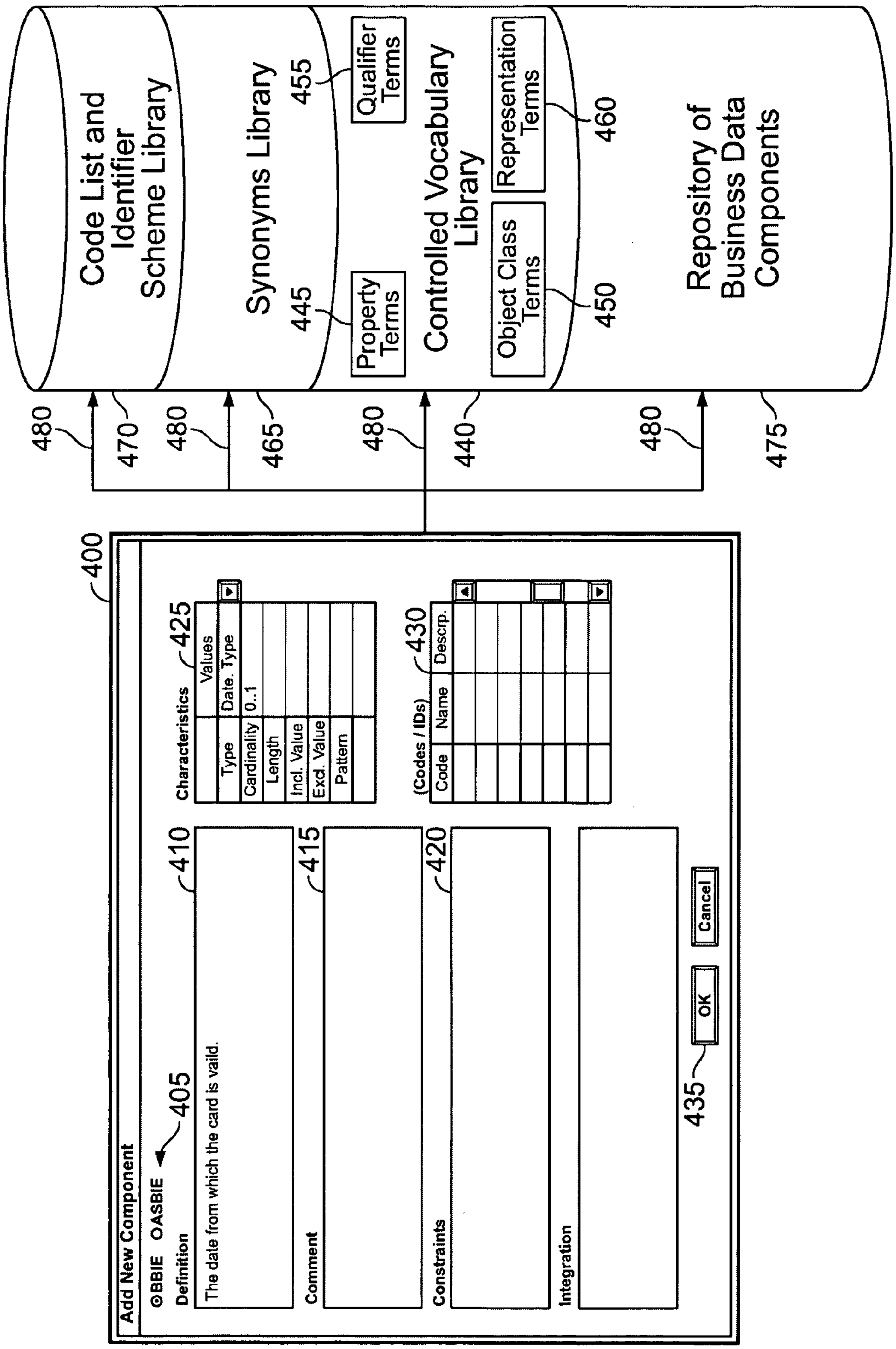
FIG. 4 illustrates the use of a component definition user interface for defining a new component.

FIG. 4 illustrates the use of a component definition user interface 400 for defining a new component. In the illustrated implementation, a user can select an option 405 to add either a BBIE or an ASBIE. In some implementations, the user may be able to select an option to add other components, such as an ABIE or a data type. As an alternative to the illustrated implementation, the user interface 400 can be an HTML editor, and the user can be presented with a template based on XHTML. The user describes the component to be added in a component description text entry field 410. The component description is typically in the form of one or more human readable sentences that semantically describe the component to be added. The component description should include a description of at least an object class and a property for the component to be added. In some cases, the object class can be assumed based on, for example, the ABIE to which a new BBIE is being added. The component description can also include a description of a representation class and one or more qualifiers for the component to be added. The description need not include the exact terms that will be used in the subsequently generated dictionary entry name. Instead, as further discussed below, a controlled vocabulary library 440 and possibly other available libraries, such as code lists, qualifier lists, electronic word dictionaries, and/or synonym libraries, can be used to identify preferred terms that have the same or a similar semantic meaning as the description.

The user can also add a comment in a comment text entry field 415. For example, the user can add a comment that explains how the component will be used or what other elements are relevant to the added component. The user can also define constraints on the component to be added in a constraint entry field 420. The constraints describe on which business circumstances or relationships the component can be used and/or not used. For example, the value of this component may be valid only if some other components satisfy particular requirements (e.g., a maximum value.)

The user can define other characteristics of the component to be added in a characteristics definition box 425. The characteristics can include a data type, cardinality, length, included values, excluded values, and/or a pattern for the component. A code/identifier box 430 allows the user to define lists of valid code values or identifier values in cases where the component to be added is associated with a code type or an identifier type (i.e., as defined using a type drop-down menu in the characteristics definition box 425).

Once the user defines the component to be added through the component definition user interface 400, the user submits the component definition by selecting a submit button 435. The textual description of the component to be added from the component description text entry field 410, along with values and/or other data from the component definition user interface 400, along with values and/or other data from the component definition user interface 400, is compared with data from entries in the controlled vocabulary library 440 to identify possible terms for constructing one or more proposed component names. The comparison between the various fields can be weighted differently. Thus, the definition field can have a higher weight and will have a higher probability during the matching procedure. The other terms are more or less weighted and have more or less of a probability during the matching procedure. The entries in the controlled vocabulary library 440 can include words or phrases that can be used to semantically describe a concept. Each entry can be associated with one or more terms in the controlled vocabulary library 440.

The controlled vocabulary library 440 can organize data using different tables for different types of terms. A property term table 445 includes a list of property terms, and each listed property term can include associated data, such as phrases that might be used to semantically describe the same concept as the property term, links to existing dictionary entry names in which the property term appears, one or more data types associated with the property term, contexts in which the property term can be used, and links to terms in other tables with which the property term can be used. An object class term table 450 includes a list of object class terms, and each listed object class term can include associated data, such as phrases that might be used to semantically describe the same concept as the object class term, links to existing dictionary entry names in which the object class term appears, instances of object classes corresponding to the object class term, valid contexts, and links to terms in other tables with which the object class term can be used.

A qualifier term table 455 includes a list of qualifier terms (e.g., adjectives), and each listed qualifier term can include associated data, such as words that might be used to semantically describe the same concept as the qualifier term, links to existing dictionary entry names in which the qualifier term appears, one or more other term types with which the qualifier term can be used, and links to terms in other tables with which the qualifier term can be used. A representation class term table 460 includes a list of representation class terms, and each listed representation class term can include associated data, such as phrases that might be used to semantically describe the same concept as the representation class term, links to existing dictionary entry names in which the representation class term appears, a data type associated with the representation class term, possible code values, identifier values, or other constraints that can be used with the representation class term, and links to terms in other tables with which the representation class term can be used.

The one or more sentences from the textual description of the component to be added can be separated into sentence fragments manually (e.g., through a user interface) or automatically (e.g., by searching for matching phrases from the controlled vocabulary library 440 and/or using a rule set that defines how to separate sentences into subject, object, and predicate parts). The sentence fragments can be compared with entries in the controlled vocabulary library 440 to identify possible terms for use in proposing component names. In addition, a synonyms library 465 can be used to identify terms in the controlled vocabulary library that are synonymous or have similar meanings as words in the textual description. The synonyms library 465 can also be incorporated into the controlled vocabulary library 440 (e.g., by including synonym data corresponding to each listed term in the tables 445, 450, 455, and 460). The use of synonym data makes it possible to identify preferred terms for use in component names even when the user uses alternative phraseology.

To generate proposed component names, other information can also be used. A code list and identifier scheme library 470 can be used to identify code types and identifier types based on information provided through the user interface 440 (e.g., data provided in the code/identifier box 430). This information can be further used to identify terms that are appropriate for generating proposed component names. Alternatively, the code list and identifier scheme library 470 can be used to identify possible code values or identifier values that correspond to the component to be added. The code list and identifier scheme library 470 can also be incorporated into the controlled vocabulary library 440. Information from one or more repositories of business data components 475 can be used to search for existing component names in the same or other contexts and to determine how terms are used in preexisting components and how those preexisting components relate to other components. This information can be used in generating proposed component names that are identical to existing component names in other contexts and/or that are modeled after existing component names.

The controlled vocabulary library 440 can be organized according to a topic map in which each term listed in the controlled vocabulary library 440 represents a topic. Topic Maps (TM) are an ISO standard (ISO/IEC 13250:2000) that provides a standardized notation for representing information about the structure of information resources used to define topics and the relationships between topics. A set of one or more interrelated documents that employs the notation and grammar defined by the ISO/IEC 13250 International Standard is called a "topic map." In general, the structural information conveyed by topic maps includes groupings of addressable information objects around topics (occurrences) and relationships between topics (associations).

Therefore, topic maps describe knowledge structures and associations with information resources. A topic map is a map of the knowledge that can be found in a document base, such as a library of BIEs and core components. It shows the relevant concepts and the relationships between them in a way similar to that of a thesaurus or an index. It also gives the definition of concepts like a glossary. It arranges the concepts in an ontology and a taxonomy. Topic maps make the structures machine processable and possible to navigate. Topic maps also provide advanced techniques for linking and addressing the knowledge structure and the document base.

Knowledge about dictionary entry names can be expressed in the form of a topic map. This topic map may consist of as many topics as necessary to describe the terms. The number of topics determine the size and complexity of the topic map.

Topics within a topic map can be in a relationship (association) with each other. In addition, topics can play different roles in different associations. Therefore, it is possible to build associations between the relevant terms of a dictionary entry name. Topics can also contain any number of external references, such as web pages, which elaborate on a specific topic to provide further information about the topic.

Topics have three kinds of characteristics: topics, occurrences, and associations. The characteristics can be effectively used for defining a model and architecture for navigating, linking, searching, and investigating terms of dictionary entry names. All three characteristics of the topic map can be used in specific contexts as defined by the context values and context categories. This model and architecture can be used for automatic searching of appropriate terms after analyzing definitions of a BIE to be added and automatic generation of complete dictionary entry names after finding the appropriate terms. Thus, topics represent the terms of a dictionary entry name. To identify the relevant terms in an entered definition, the components of the sentences and the corresponding context are considered. The definition contains fields that form a set of potential candidates for topic types. Moreover, by looking at the context, basic associations between topic types can be identified. For example, in the context of the industry classification: "Aviation", the associations "destination city of a flight connection" or "arrival of a flight connection" can be identified.

An occurrence is a link to one or more real information objects for the terms, like a report, a comment, a video, or a picture. Generally, an occurrence is not part of a topic map.

Figure 9:
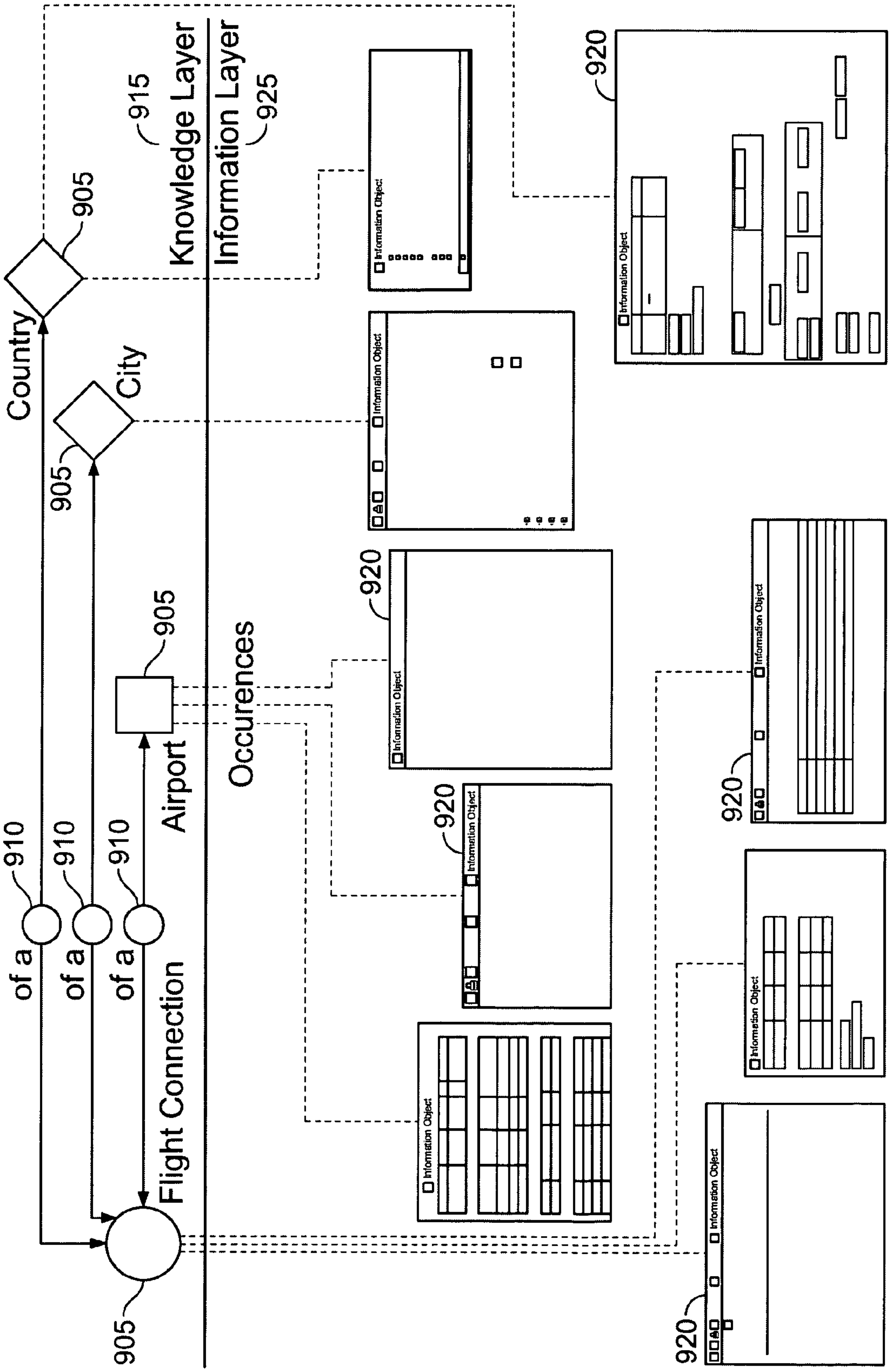
FIG. 9 is a block diagram illustrating an example of a topic map concept.

Topic associations describe the relationships between terms. FIG. 9 is a block diagram illustrating an example of a topic map concept. Knowledge about the terms 905 and the relationships 910 between the terms 905 is expressed in a knowledge layer 915. Each term 905 is linked to one or more occurrences 920 in an information layer 925. Generally, topic associations are not one-way relationships. They are symmetric as well as transitive and thus, they have no direction. Association types can be used to group term associations and the involved terms.

The terms, component parts of a sentence, and context values can be organized in columns of the tables 445, 450, 455, and 460. For example, the property term table 445 can include a property term that represents a topic within a topic map, a component part that represents an association that can be used to construct a dictionary entry name into the right order and a context category and context values can be represented by a scope element of the topic map. Associations between the definitions and dictionary entry names can be realized by the topic maps mechanism. The associations, terms, and scope, which can be defined in the correct order by the topic map mechanism helps generate a dictionary entry name in the correct manner. Each term in the tables is an instance of a topic type that defines a term type (e.g., object class term, property term, representation class term, or qualifier). Terms that can have different term types in different component names (e.g., the term "party" can be used as an object class term or as a property term) can be represented by different topics corresponding to each term type. In addition, different instances of a term with the same term type can be represented by different topics corresponding to each instance. The topic map also includes data identifying occurrences of each term, associations of the term with other terms, and scope information for each term instance.

Figure 5:
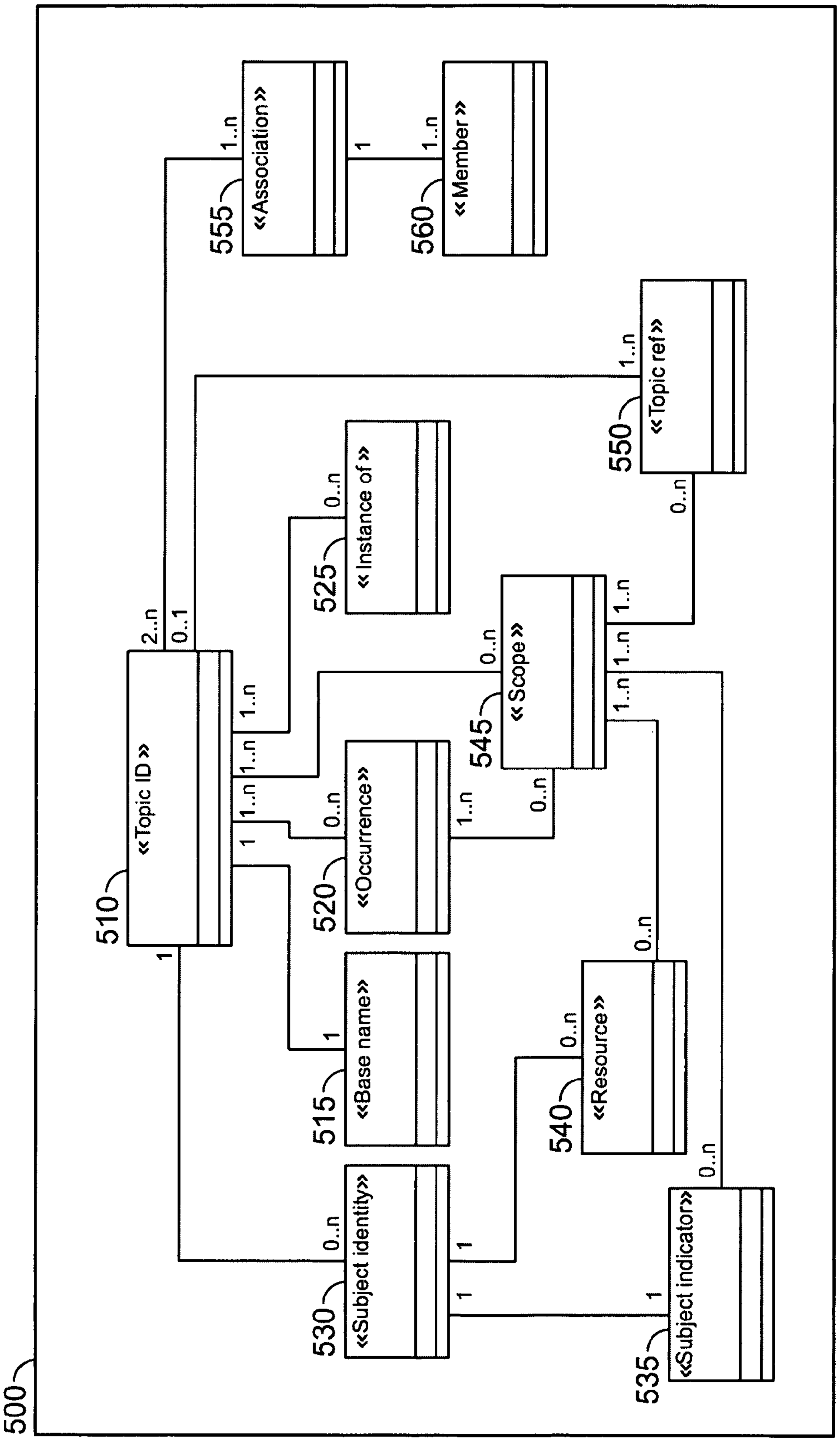
FIG. 5 illustrates a UML class diagram of a topic map that can be used for the controlled vocabulary library.

The topic map of the controlled vocabulary library 440 can be described using XML and can be represented using UML class diagrams. FIG. 5 is a UML class diagram 500 of a topic map that can be used for the controlled vocabulary library 440. Each topic is represented by a topic identifier 510 (e.g., a numerical identifier) that includes (or refers to) a number of elements. The elements can include a "base name" element 515 (i.e., the term that corresponds to the topic), zero or more "occurrence" elements 520 (i.e., information resources that are relevant to the topic), zero or more "instance of" elements 525 that specify a category (e.g., object, property, representation, etc.) of which the term is an instance, zero or more "subject identity" elements 530 that refer to subject indicators 535 and/or resources 540 (e.g., for use in identifying synonyms), and zero or more "scope" elements 545 (e.g., for defining context categories and context values in which the term can be used). Each "occurrence" element 520 can also have a scope as defined by one or more scope elements 545. A topic reference element 550 provides a URI reference to another topic, which will be another term value of the dictionary entry name. The target of a topic reference link must resolve to a topic element child of a topic map document. The target topic need not be in the document entity of origin. A topic reference element 550 will be used for the completion of dictionary entry names or for referencing to other topics, which will be necessary for the complete understanding of a term value. The topic reference element 550 could also reference to other information in other XTM-based documents.

Terms can be classified according to their term-types of the dictionary entry name. In a topic map, any given term is an instance of zero or more term-types. Term-types are themselves defined as topics. A term type would be "ObjectClassQualifier", "ObjectClassTerm", "PropertyQualifier", "PropertyTerm", "RepresentationTerm", "AssociationTerm", "DataTypeQualifier", and "DataType".

Each topic can also include one or more "association" elements 555, which define an association with one or more other topics. The topic map uses associations to describe relationships between the terms of a dictionary entry name. A topic association asserts a relationship between two or more topics. Examples might be as follows:

"This name is the departure city of a flight connection"

"This code specifies the departure country of a flight connection"

"This is the local date and time of the arrival of a flight connection"

"This is the duration of a flight of a flight connection"

"This is the duration of a duration in date of a flight connection"

The association type for the relationships mentioned above are "this", "this_is", "is_the" "of_a" etc. In topic maps, association types are themselves defined in terms of topics.

The ability to do typing of topic associations makes it possible to group together the set of terms of a dictionary entry name that have the same relationship to any given topic. This feature is useful for navigating large pools of information in generating dictionary entry names.

It should be noted that topic types are regarded as a special (i.e., syntactically privileged) kind of association type; the semantics of a topic having a type (for example, the Airport of a Flight Connection) could equally well be expressed through an association (of type "type-instance") between the topic of the object class term "Flight Connection" and the topic of the property term "Airport". The reason for having a special construct for this kind of association is the same as the reason for having special constructs for certain kinds of names (indeed, for having a special construct for names at all): The semantics are so general and universal that it is useful to standardize them to maximize interoperability between systems that use the dictionary entry names.

While both topic associations and normal cross references are hyperlinks, they are different: In a cross reference, the anchors (or end points) of the hyperlink occur within the information resources (although the link itself might be outside them); with topic associations, links (between topics) are completely independent of whatever information resources may or may not exist or be considered as occurrences of those topics.

Associations between terms (topics) are created as instances of the association element. The element has only the sub-element "member" 560, which specifies instances of the members. The member element 560 is used to define each member role of the association and the terms (topics) which play that role. Each topic that participates in an association plays a role in that association, which can be expressed by the term types of a dictionary entry name. In the case of the relationship "Departure City of a Flight Connection", expressed by the association between "Departure City" and "Flight Connection", those roles might be "PropertyTerm" and "ObjectClassTerm". Associations are multidirectional.

Different types of associations are possible. For example, a term having a property type can be associated with one or more terms having an object class type. The association can be based on object class terms with which the property term is used or can be used in a component name. Similarly, a term having a qualifier type can be associated with one or more other terms having one or more term types.

The topic map model allows three things to be said about any particular topic: what names (terms) it has, what associations it participates in, and what its occurrences of information are. These three kinds of assertions are known collectively as topic characteristics. Assignments of topic characteristics are generally made within a specific context based on the context values and their context categories, which may or may not be explicit. For example the term "Flight Connection" is expect in the context value "Aviation" within the context category "Industry Classification".

The scope element 545 specifies the extent of validity for a topic characteristic. A topic characteristic is the context value from a context category, in which each term value (base name), occurrence, or association will be used. The scope element 545 includes one or more of a topic reference element 550, a subject indicator 535, and/or a resource 540. Each topic reference element 550 references a topic element 510 ("scoping topic") whose subject contributes to the scope. Two topic reference elements 550 can be used for the representation the context category and context value. Each resource element 540 references a resource that contributes to the scope. It is possible to define the context values and context categories by an URI. Each subject indicator element 535 references a resource that indicates the identity of the subject that contributes to the scope. A declaration of a topic characteristic is generally valid only within a scope, if specified. When a topic characteristic declaration does not specify a scope, however, the topic characteristic is valid in an unconstrained scope.

As an alternative or in addition to implementing separate libraries 440, 465, 470, and 475, the information from the various libraries 440, 465, 470, and 475 can be incorporated into the topic map. For example, the topic map can link each term in the controlled vocabulary library 440 to phrases that might be used to semantically describe the same concept as the term, to existing dictionary entry names and components in which the term appears, to one or more data types for the term, to other terms with which the term can be used, to synonyms for the term, and to code values or identifier values with which the term may be used. The topic map can also include information defining associations between business process models in a repository of business data components 475. The associations between business process models can be explicitly defined or can be derived from associations between topics and/or names.

When the user submits the component definition through the user interface 400, a matching algorithm conducts a search for terms that can be used to generate one or more proposed component names. The matching algorithm searches (480) the various libraries 440, 465, 470, and 475 for terms that can be combined into a component name having the same or a closely related semantic meaning as the component description and having any constraints, characteristics, and other limitations provided in the component definition. For example, the matching algorithm can search a topic map (e.g., a topic map based on the class diagram 500 shown in FIG. 5) that incorporates the information from the various libraries 440, 465, 470, and 475. The matching algorithm can include one or more of a tetragram analysis, an alpha-beta-pruning strategy, a Levinstein editing measure distance, fuzzy matching, matching tools within W3C Semantic Web, and Text Retrieval and Information Extraction (TREX, Linguistic Matcher, Type Matcher, Structural Matcher, and Match Learning Machines). Other algorithms capable of searching topic maps can also be used. TREX is included in a number of software products available from SAP AG of Walldorf (Baden), Germany, such as SAP Netweaver Knowledge Management. TREX provides a wide spectrum of intelligent search, retrieval, and classification functions. Among other things, TREX incorporates a Levinstein editing measure distance, fuzzy matching, and a topic maps search algorithm.

The matching algorithm can perform the search to identify at least an object class term and a property term and, in some cases, a representation class term and/or one or more qualifier terms for each proposed component name to be generated. In addition to using a textual description of the component to be added, the matching algorithm can also use context information, characteristics, constraints, valid values, and/or other limitations defined by the user to identify appropriate terms. The search may be conducted for similar or identical components in other related contexts (e.g., using information defining associations between business process models). For example, the matching algorithm may use the defined context for the component to be added to identify similar or identical components in similar contexts (e.g., using the scope and occurrences of terms as defined in scope elements 545 and occurrence elements 520 shown in FIG. 5).

In addition, the search may be conducted for terms that are defined in the controlled vocabulary library 440 as corresponding to a fragment of the textual description and/or one or more of the defined limitations. For example, the topic map may define particular terms as referring to a particular semantic meaning and also as implying particular limitations. Typically, terms are defined in the topic maps based, at least in part, on semantic meanings and limitations associated with existing component names. In other words, definitions of terms and combinations of terms are derived from instances of the terms. A particular implementation of a matching algorithm therefore can be designed to identify terms and combinations of terms that most nearly correspond to the component definition provided by the user. The matching algorithm can also use information about associations between terms to identify appropriate combinations of terms to form the proposed component names. For example, the topic map may include associations between a particular property term and multiple object class terms. These associations define object class terms with which the particular property term can be used. The matching algorithm processes the results of the search to generate one or more proposed component names.

Figure 6:
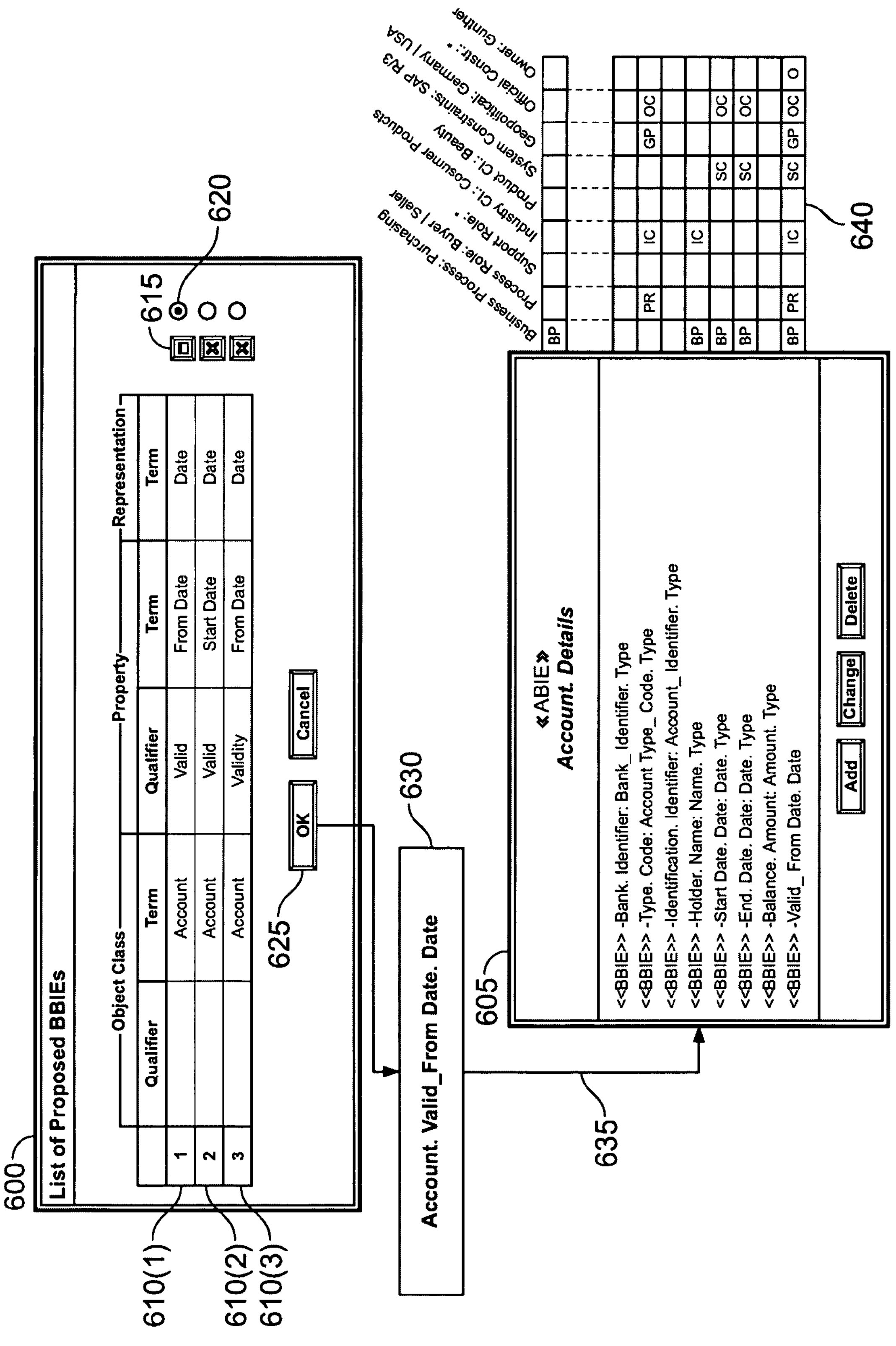
FIG. 6 illustrates a user interface window for selecting a proposed component name and adding the selected component name to an ABIE.

FIG. 6 illustrates a user interface window 600 for selecting a proposed component name and adding the selected component name to an ABIE 605. The proposed component names 610 can include existing component names 610(1) (e.g., "Account.Valid_From Date.Date", where "Account" is the object class term, "Valid" is a property qualifier, "From Date" is the property term, and "Date" is the representation class term) from a different context and/or new component names 610(2) and 610(3) (e.g., "Account.Valid_Start Date.Date" or "Account.Validity_From Date.Date"). The new component names 610(2) and 610(3) can be constructed from terms in the controlled vocabulary library 440 that have not previously been combined to form a component name or, in some situations, can include a term or terms not previously included in the controlled vocabulary library 440. The new component names are constructed in accordance with the ISO 11179 framework, Web Ontology Language (OWL), RDF (Resource Description Framework), and/or UN/CEFACT/ebXML CCTS requirements.

For existing component names, a button 615 can be selected to display a semantic description of the component and/or other attributes, characteristics, context definitions (e.g., context categories and context drivers), or other definitions of the existing component. The user can also modify a proposed component name (e.g., to add a qualifier or to change a term) and can select a proposed name 610(1) to be added to the ABIE 605 using a user interface selection element 620. The user can then select an accept button 625 to accept the selected component name 610(1). As a result, a new dictionary entry name 630 for the new component is generated and added (635) to the ABIE 605.

The structure of the new component can be modeled after an existing component from which the new component name is copied or can be modeled after existing components that include terms from which the new component name is constructed. The existing components can be used in generating XML schema, JAVA classes, ABAP Objects, database tables, XML schema structure, and/or a user interface structure for the new component. The new component can also be added to the repository of a repository of business data components (see FIGS. 2 and 4) for use in business processes and generating additional new component names. The structure of the new component and the addition to the repository of business data components can be performed automatically or semi-automatically (e.g., by providing the user with access to relevant parts of existing components). The new component generally has a limited scope in that it can be used only in the defined context (e.g., as defined in context definition user interface 215 of FIG. 2). In this case, for example, the new component is limited to use in a particular combination of context categories: business process, process role, industry classification, system constraints, geopolitical, official constraints, and owner limitations (as indicated in the context chart 640). The new component can subsequently be added to other contexts as well, which results in a removal of some of the context limitations.

Figure 7:
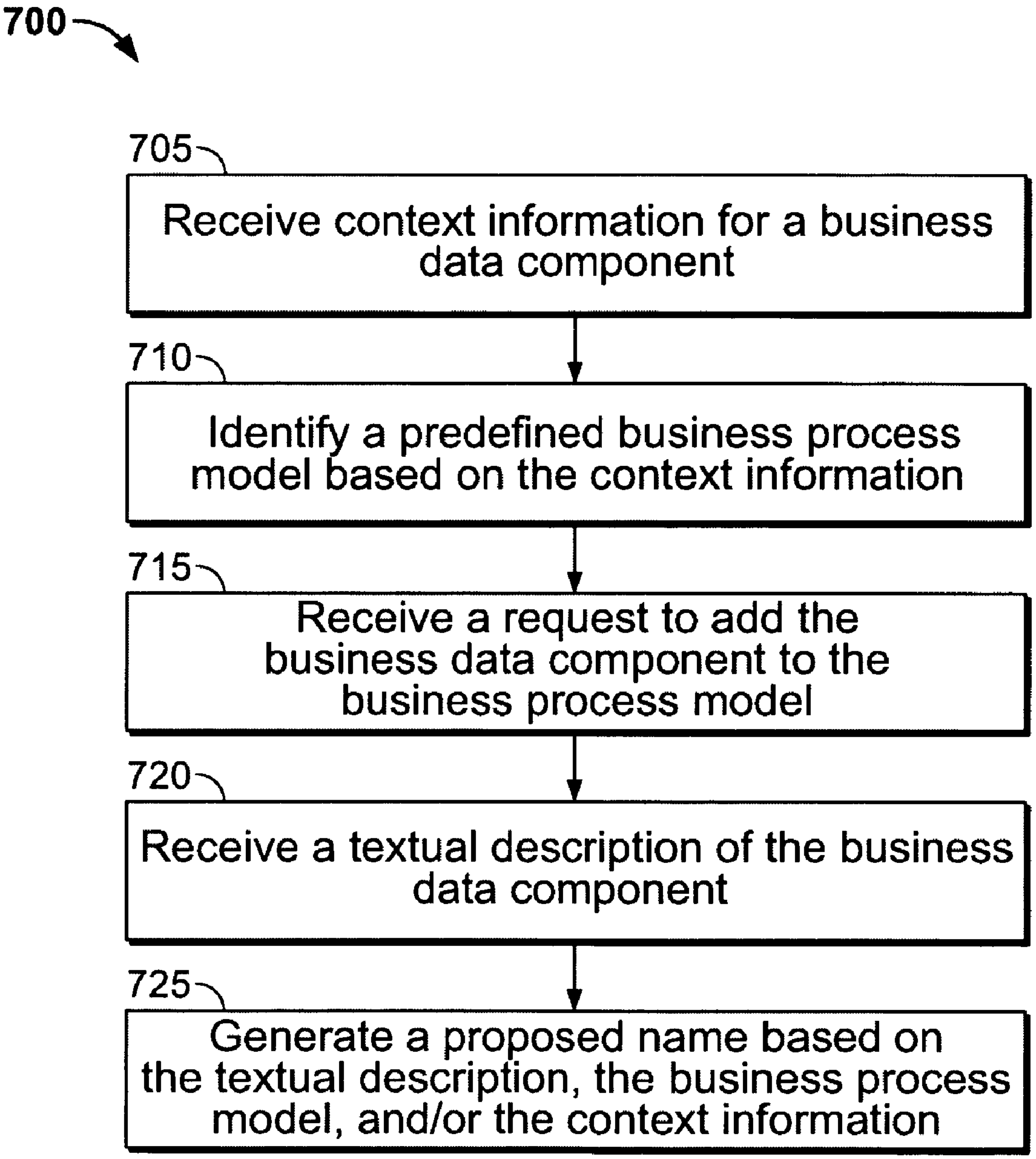
FIG. 7 is a flow diagram of a process for generating business data component names.

FIG. 7 is a flow diagram of a process 700 for generating business data component names. Context information for defining a business data component is received (705). The context information can be received at a processor from a user interface. A predefined business process model is identified based on the context information (710). The processor can use a search algorithm to identify a business process model that matches the context information. A request to add the business data component to the business process model is received (715) by the processor through a user interaction with a user interface. The user also provides a textual description of the business data component, which is received (720) by the processor (See fields 410-420 in FIG. 4). One or more proposed names for the business data component are generated (725). The proposed names are generated in accordance with a predefined naming format, in which a name generally includes an object class term, a property term, and a representation class term. In some cases, the name can include a qualifier term for one or more of the other terms. The processor uses a matching algorithm to select terms from a library of available terms based on the textual description. In addition, the matching algorithm can use the context information, information from the business process model, and/or information from one or more other business process models to generate the proposed names.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 8:
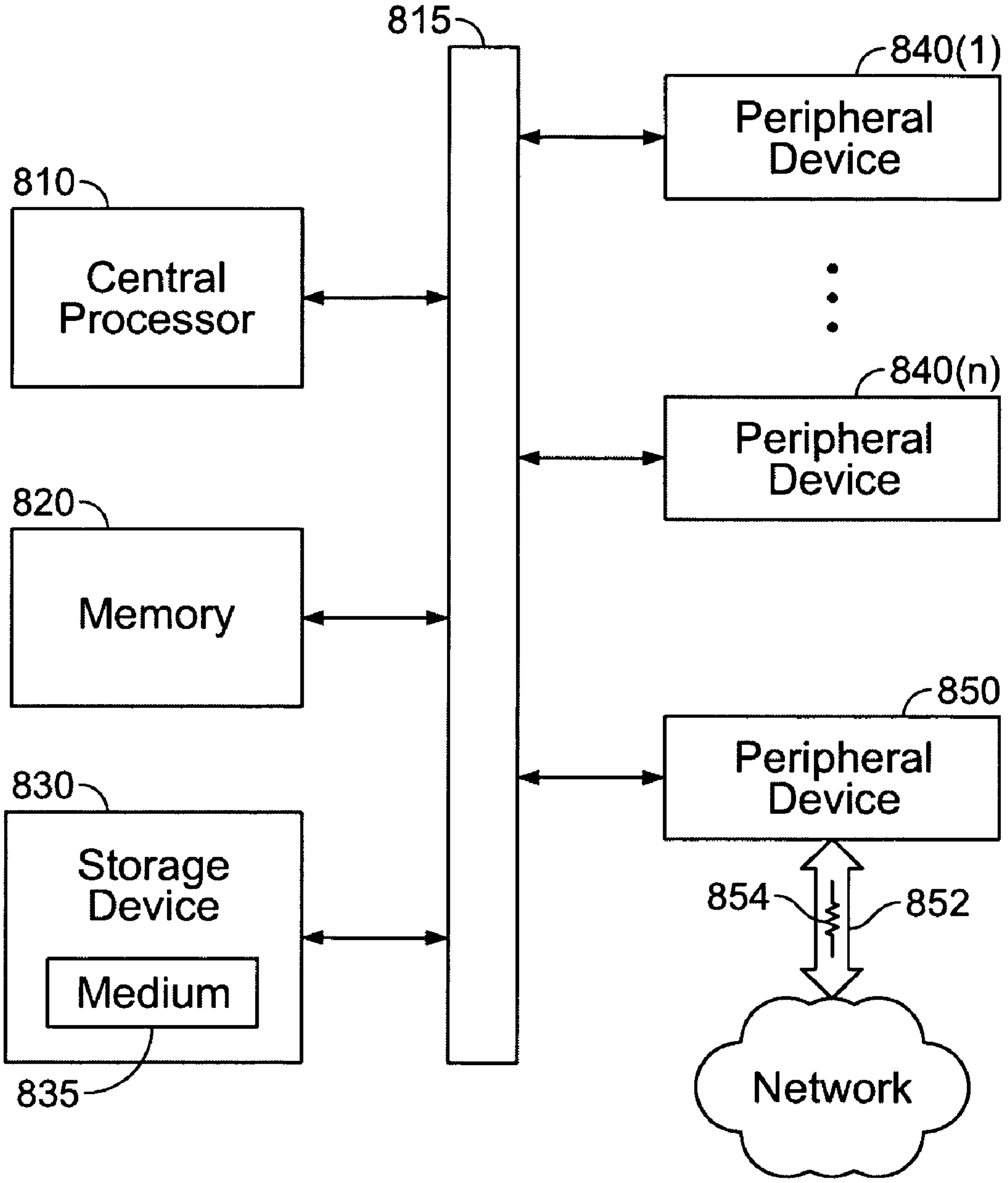
FIG. 8 is a block diagram illustrating an example data processing system in which a system for generating business data component names can be implemented.

FIG. 8 is a block diagram illustrating an example data processing system 800 in which a system for generating business data component names can be implemented. The data processing system 800 includes a central processor 810, which executes programs, performs data manipulations, and controls tasks in the system 800. The central processor 810 is coupled with a bus 815 that can include multiple busses, which may be parallel and/or serial busses.

The data processing system 800 includes a memory 820, which can be volatile and/or non-volatile memory, and is coupled with the communications bus 815. The system 800 can also include one or more cache memories. The data processing system 800 can include a storage device 830 for accessing a storage medium 835, which may be removable, read-only, or read/write media and may be magnetic-based, optical-based, semiconductor-based media, or a combination of these. The data processing system 800 can also include one or more peripheral devices 840(1)-**840(*n*) (collectively, devices 840**), and one or more controllers and/or adapters for providing interface functions.

The system 800 can further include a communication interface 850, which allows software and data to be transferred, in the form of signals 854 over a channel 852, between the system 800 and external devices, networks, or information sources. The signals 854 can embody instructions for causing the system 800 to perform operations. The system 800 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 800 and/or delivered to the machine 800 over a communication interface. These instructions, when executed, enable the machine 800 to perform the features and function described above. These instructions represent controllers of the machine 800 and can be implemented in a high-level procedural and/or object-oriented programming language, and/or in assembly/machine language. Such languages can be compiled and/or interpreted languages.

The invention has been described in terms of particular embodiments, but other embodiments can be implemented and are within the scope of the following claims. For example, the invention can also be used for semi-automatic mapping between different business communication schemas. If a business entity of a schema cannot be mapped to already stored BIEs, the semi-automatic mapping system can use the techniques of this invention for generating a new BIE by using the definition of the business entity. Other embodiments are within the scope of the following claims.

What is claimed is:

1. A computer program product, tangibly embodied in an information carrier, the computer program product being operable to cause data processing apparatus to:

present a plurality of selectable business process models to a user in response to at least a request to add a business data component to a business process model, the request including a textual description of the business data component generated by the user;

receive a selection of one of the plurality of business models;

in response to at least the selection, identify terms from a library, including associates between the terms, used to generate proposed names for business data components in connection with adding the business data components to business process models, the library includes terms and associates for each of the plurality of selectable business models;

search the identified terms using a matching algorithm and the textual description to select terms associated with the business data component and used to add business components to the selected business process model, each term in the library of available terms defining at least one of an object class, a property, a representation class, or a qualifier;

combine, in accordance with a predefined naming format, at least portions of the selected terms to generate a proposed name for the business data component in the selected business process model;

receive context information for defining the business data component;

identify a predefined business data model based on the context information;

receive a request to add the business data component to the business data model, wherein the matching algorithm uses a context defined by at least one of the context information or the predefined business data model to select terms from the library of available terms;

update the selected business process model with the business data component using the proposed name, wherein the at least one proposed name includes a business data component name included in a business data model for a different context; and a topic map defines associations between a plurality of business data models including the predefined business data model and the business data model for the different context, the computer program product being operable to cause data processing apparatus to identify the business data model for the different context based on a relationship with the predefined business data model defined in the topic map.

2. The computer program product of claim 1 wherein the computer program product is operable to further cause data processing apparatus to modify the business data model to include a selected one of the at least one proposed name.

3. The computer program product of claim 1 wherein the textual description includes a description of at least two elements selected from the group consisting of an object class, a property, a representation class, and a qualifier.

4. The computer program product of claim 3 wherein the library of available terms defines associations between the available terms and the at least one proposed name for the business data component is generated based on the defined associations between terms.

5. The computer program product of claim 1 wherein at least one proposed name for the business data component includes an object class term, a property term, and a representation class term.

6. The computer program product of claim 5 wherein at least one proposed name for the business data component includes a qualifier term associated with at least one of the object class term, the property term, or the representation class term.

7. The computer program product of claim 1 wherein the library of available terms comprises a topic map of terms included in predefined business data component names, the topic map defining associations between each term and one or more predefined business data component names included in a set of business data models.

8. The computer program of claim 7 wherein the topic map defines associations based on component parts of sentences.

9. The computer program product of claim 7 wherein the computer program product is operable to further cause data processing apparatus to modify at least one business data model in the set of business data models to include a selected one of the at least one proposed name in a specific context.

10. The computer program product of claim 7 wherein the matching algorithm selects terms using the topic map to combine terms to generate each proposed name.

11. The computer program product of claim 10 wherein the matching algorithm selects terms based on at least one limitation for the business data component selected from the group consisting of a constraint, a characteristic, one or more valid values, and a specified context.

12. A system for generating business component names, the system comprising:

memory; and a data processing apparatus communicatively coupled to the memory, the data processing apparatus operable to:

present a plurality of selectable business process models to a user in response to at least a request to add a business data component to a business process model, the request including a textual description of the business data component generated by the user;

receive a selection of one of the plurality of business models;

in response to at least the request for the selection, execute software means for identifying terms from a library, including associates between the terms, used to generate proposed names for business data components in connection with adding the business data components to business process models, the library includes terms and associates for each of the plurality of selectable business models;

execute software means for searching the identified terms and the associations between the identified terms using a matching algorithm and the textual description to select terms associated with the business data component and used to add business components to the selected business model;

execute software means for combining at least a portion of the selected terms to generate at least one proposed name for the business data component in accordance with a predefined naming format, the predefined naming format defining a name as including a plurality of terms for semantically describing a business data component, wherein the plurality of terms include at least two terms from the group consisting of an object class term, a property term, a representation class term, a qualifier term, a context category, and a context value;

execute software means for receiving context information for defining the business data component;

identify a predefined business data model based on the context information;

receive a request to add the business data component to the business data model, wherein the matching algorithm uses a context defined by at least one of the context information or the predefined business data model to select terms from the library of available terms;

update the selected business process model with the business data component using the proposed name, wherein the at least one proposed name includes a business data component name included in a business data model for a different context; and a topic map defines associations between a plurality of business data models including the predefined business data model and the business data model for the different context, identifying the business data model for the different context based on a relationship with the predefined business data model defined in the topic map.

13. The system of claim 12 wherein the software means for generating at least one proposed name is operable to select, for each proposed name, a plurality of terms from the available terms based on a correspondence between the description and a semantic meaning of the selected plurality of terms and a relationship between a context of the at least one proposed name and a context of each of the selected plurality of terms.

14. The system of claim 12 wherein the data processing apparatus is further operable to search available terms and associations between the terms using a topic map with each term corresponding to a topic and each topic associated with at least one other topic and with a component part of a sentence.

15. The system of claim 14 wherein each topic corresponding to a term includes a plurality of elements defining at least one of an occurrence of the term, a topic of which the term is an instance, or a scope associated with the term.

16. A method for defining a business data component name, the method comprising:

presenting a plurality of selectable business process models to a user in response to at least a request to add a business data component to a business process model, the request including a textual description of the business data component generated by the user;

receiving a selection of one of the plurality of business models;

in response to at least the selection, identifying terms from a library, including associates between the terms, used to generate proposed names for business data components in connection with adding the business data components to business process models, the library includes terms and associates for each of the plurality of selectable business models;

searching the identified terms using a matching algorithm and the textual description to select terms associated with the business data component and used to add business components to the selected business process model, each term in the library of available terms defining at least one of an object class, a property, a representation class, or a qualifier;

combining, in accordance with a predefined naming format, at least portions of the selected terms to generate a proposed name for the business data component in the selected business process model;

receiving context information for defining the business data component;

identifying a predefined business data model based on the context information;

receiving a request to add the business data component to the business data model, wherein the matching algorithm uses a context defined by at least one of the context information or the predefined business data model to select terms from the library of available terms;

updating the selected business process model with the business data component using the proposed name, wherein the at least one proposed name includes a business data component name included in a business data model for a different context; and a topic map defines associations between a plurality of business data models including the predefined business data model and the business data model for the different context, to identify the business data model for the different context based on a relationship with the predefined business data model defined in the topic map.

17. The method of claim 16 further comprising generating the name for the business data component is further based on the context definition and a context associated with each of the at least one predefined business data component.

18. The method of claim 16 wherein the library of available terms comprises a topic map defining associations between the available terms and generating the name for the business data component is further based on the associations between the available terms.

19. The method of claim 16 wherein generating a name for the business data component comprises using at least one of a synonym library, a code list, or a qualifier list.

20. The method of claim 16 wherein the associations between the available terms define dictionary entry names in different contexts, the name including a dictionary entry name in a different context.

21. The method of claim 16 wherein the description includes a description of at least two elements selected from the group consisting of an object class, a property, a representation class, and a qualifier.

22. The method of claim 16 wherein generating a name comprises selecting terms based on at least one limitation for the business data component selected from the group consisting of a constraint, a characteristic, one or more valid values, and a specified context.

* * * * *